United States Patent
Wakairo et al.

(10) Patent No.: US 11,720,086 B2
(45) Date of Patent: Aug. 8, 2023

(54) MACHINING-PROCESS GENERATION DEVICE, AND MACHINING-PROCESS GENERATION METHOD

(71) Applicant: Mitsubishi Electric Corporation, Chiyoda-ku (JP)

(72) Inventors: Joji Wakairo, Tokyo (JP); Kenji Iriguchi, Tokyo (JP); Susumu Matsubara, Tokyo (JP); Hiroki Kaneko, Tokyo (JP); Savilleramadhona, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 518 days.

(21) Appl. No.: 16/465,851

(22) PCT Filed: Jul. 11, 2017

(86) PCT No.: PCT/JP2017/025309
§ 371 (c)(1),
(2) Date: May 31, 2019

(87) PCT Pub. No.: WO2018/123116
PCT Pub. Date: Jul. 5, 2018

(65) Prior Publication Data
US 2019/0339676 A1    Nov. 7, 2019

(30) Foreign Application Priority Data
Dec. 26, 2016   (JP) .................................. 2016-251217

(51) Int. Cl.
G05B 19/418   (2006.01)
G05B 19/4093  (2006.01)

(52) U.S. Cl.
CPC . *G05B 19/41815* (2013.01); *G05B 19/40937* (2013.01); *G05B 2219/36287* (2013.01); *G05B 2219/36289* (2013.01)

(58) Field of Classification Search
None
See application file for complete search history.

(56) References Cited

U.S. PATENT DOCUMENTS 6,107,768 A * 8/2000 Ouchi .............. G05B 19/40937
                                                  318/568.1
6,401,004 B1 * 6/2002 Yamazaki ........ G05B 19/40937
                                                  700/159
(Continued)

FOREIGN PATENT DOCUMENTS

JP    5-269646 A    10/1993
JP   10-58280 A     3/1998
(Continued)

OTHER PUBLICATIONS

Chinese Office Action dated Aug. 24, 2021 in Chinese patent application No. 201780079999.5.
(Continued)

*Primary Examiner* — Mohammad Ali
*Assistant Examiner* — David Earl Ogg
(74) *Attorney, Agent, or Firm* — Xsensus LLP

(57) ABSTRACT

A machining-process generation device includes: a process-instance storage section to store therein a process instance that is an instance of a machining process indicating machining details of each machining-operation unit; a process generation section to generate a machining process on a basis of the process instance and a generation condition for the machining process, and to generate background information indicating a background to generation of the machining process, the background information including information of the process instance used to generate the machining
(Continued)

process; and a display section capable of displaying the background information on a display device.

15 Claims, 21 Drawing Sheets

(56) References Cited

U.S. PATENT DOCUMENTS

| | | | | |
|---|---|---|---|---|
| 6,438,445 | B1* | 8/2002 | Yoshida | G05B 19/40937 700/173 |
| 6,535,788 | B1 | 3/2003 | Yoshida et al. | |
| 2002/0082742 | A1* | 6/2002 | Kadono | G05B 19/4093 700/192 |
| 2003/0004596 | A1* | 1/2003 | Landers | G05B 19/4097 700/98 |
| 2007/0185607 | A1* | 8/2007 | Kamiya | G05B 19/4093 700/180 |
| 2010/0076724 | A1* | 3/2010 | Brown | G06Q 50/04 702/179 |
| 2012/0078574 | A1* | 3/2012 | Slates | G05B 23/0272 702/182 |
| 2015/0026107 | A1* | 1/2015 | Vijayaraghavan | G06N 20/00 706/12 |

FOREIGN PATENT DOCUMENTS

| | | | |
|---|---|---|---|
| JP | 2000-84794 | A | 3/2000 |
| JP | 2003241808 | A * | 8/2003 |

OTHER PUBLICATIONS

International Search Report dated Oct. 17, 2017 in PCT/JP2017/025309 filed Jul. 11, 2017.
Office Action dated Jan. 10, 2022 in Chinese Patent Application No. 201780079999.5, 8 pages.

* cited by examiner

FIG.8

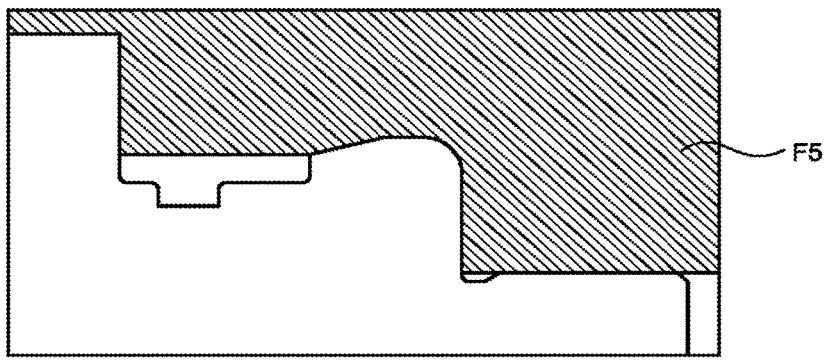

FIG.9

- CONDITIONS FOR EXTRACTING PROCESS INSTANCE:
  - RAW-MATERIAL TYPE      A5052
  - AVAILABLE MACHINING    EITHER OF TWO TYPES, FACING OR OUTER-DIAMETER TURNING
- MOST FREQUENTLY USED    FACING IN 9 OUT OF 10 INSTANCES

| AXIAL LENGTH | RADIAL LENGTH | SIMILARITY INDEX VALUE | INSTANCE NUMBER | MACHINING-OPERATION NUMBER | MACHINING METHOD |
|---|---|---|---|---|---|
| 80 | 60 | 0 | GENERATION-TARGET UNIT | 1 | FACING |
| 82 | 55 | 29 | 2609 | 1 | FACING |
| 84 | 55 | 41 | 3213 | 1 | FACING |
| 79 | 53 | 50 | 3292 | 1 | FACING |
| 82 | 67 | 53 | 3757 | 1 | FACING |
| 90 | 59 | 101 | 5776 | 1 | FACING |
| 90 | 55 | 125 | 6672 | 1 | FACING |
| 80 | 47 | 169 | 7906 | 1 | OUTER-DIAMETER TURNING |
| 70 | 52 | 164 | 9174 | 1 | FACING |
| 94 | 57 | 205 | 9699 | 1 | FACING |
| 77 | 44 | 265 | 9852 | 1 | FACING |

| MACHINING NUMBER | MACHINING METHOD | TOOL TO BE USED | MACHINED SHAPE | MACHINING CONDITION |
|---|---|---|---|---|
| 1 | FACING | FACING TURNING 1 | REGION 1 | CONDITION 1 |
| 2 | OUTER-DIAMETER TURNING | OUTER-DIAMETER TURNING 1 | REGION 2 | CONDITION 2 |
| 3 | OUTER-DIAMETER GROOVING | OUTER-DIAMETER GROOVING 1 | REGION 3 | CONDITION 3 |

FIG.12

BACKGROUND INFORMATION
·PROCESS GENERATION METHOD: EXTRACT INSTANCES AND MEASURE FREQUENCY OF USE OF MACHINING METHOD IN 10 INSTANCES WITH SIMILAR AXIAL LENGTH AND RADIAL LENGTH (DIAMETER) TO THOSE OF PRODUCT SHAPE FROM AMONG EXTRACTED INSTANCES
·INSTANCE EXTRACTION CONDITIONS
   ·RAW-MATERIAL TYPE     A5052
   ·AVAILABLE MACHINING    EITHER OF TWO TYPES, FACING OR OUTER-DIAMETER TURNING
·GENERATION RESULT: FACING (APPLICABLE TO 9 OUT OF 10 INSTANCES)

EXTRACTED INSTANCES:                                                  901

| AXIAL LENGTH | RADIAL LENGTH | INSTANCE NUMBER | MACHINING NUMBER | MACHINING METHOD |
|---|---|---|---|---|
| 80 | 60 | CURRENTLY-GENERATED NEW PROCESS | 1 | FACING |
| 82 | 55 | 2609 | 1 | FACING |
| 84 | 55 | 3213 | 1 | FACING |
| 79 | 53 | 3292 | 1 | FACING |
| 82 | 67 | 3757 | 1 | FACING |
| 90 | 59 | 5776 | 1 | FACING |
| 90 | 55 | 6672 | 1 | FACING |
| 80 | 47 | 7906 | 1 | OUTER-DIAMETER TURNING |
| 70 | 52 | 9174 | 1 | FACING |
| 94 | 57 | 9699 | 1 | FACING |
| 77 | 44 | 9852 | 1 | FACING |

STATISTICS OF EXTRACTED INSTANCES:                 902

| | AXIAL LENGTH | RADIAL LENGTH | INSTANCE NUMBER | MACHINING NUMBER | MACHINING METHOD |
|---|---|---|---|---|---|
| MINIMUM AXIAL LENGTH | 70 | 52 | 9174 | 1 | FACING |
| MAXIMUM AXIAL LENGTH | 94 | 57 | 9699 | 1 | FACING |
| MINIMUM RADIAL LENGTH | 77 | 44 | 9852 | 1 | FACING |
| MAXIMUM RADIAL LENGTH | 82 | 67 | 3757 | 1 | FACING |
| AVERAGE | 82.8 | 54.4 | | | |

FIG.13

CURRENT MACHINING TARGET
·MATERIAL TYPE: A5052

| MACHIN-ING NUMBER | MACHINING METHOD | TOOL TO BE USED | MACHINED SHAPE | MACHINING CONDITION |
|---|---|---|---|---|
| 1 | FACING | FACING TURNING 1 | REGION 1 | CONDITION 1 |
| 2 | OUTER-DIAMETER TURNING | OUTER-DIAMETER TURNING 1 | REGION 2 | CONDITION 2 |
| 3 | OUTER-DIAMETER GROOVING | OUTER-DIAMETER GROOVING 1 | REGION 3 | CONDITION 3 |

INSTANCE 9852
·MATERIAL TYPE: A5052

| MACHIN-ING NUMBER | MACHINING METHOD | TOOL TO BE USED | MACHINED SHAPE | MACHINING CONDITION |
|---|---|---|---|---|
| 1 | FACING | FACING TURNING 1 | REGION 11 | CONDITION 1 |
| 2 | OUTER-DIAMETER TURNING | OUTER-DIAMETER TURNING 2 | REGION 12 | CONDITION 12 |
| 3 | OUTER-DIAMETER GROOVING | OUTER-DIAMETER GROOVING 1 | REGION 13 | CONDITION 13 |
| 4 | OUTER-DIAMETER GROOVING | OUTER-DIAMETER GROOVING 2 | REGION 14 | CONDITION 14 |

FIG.14

BACKGROUND INFORMATION
· PROCESS GENERATION METHOD: EXTRACT INSTANCES AND ESTIMATE
　　　　　　　　　　　　　　　BY REGRESSION ANALYSIS
· INSTANCE EXTRACTION CONDITIONS
　　· RAW-MATERIAL TYPE　　A5052
　　· MACHINING METHOD　　OUTER-DIAMETER TURNING

| REMOVAL VOLUME | CUTTING SPEED (ESTIMATED) | CUTTING SPEED (ACTUAL) | INSTANCE NUMBER | MACHINING NUMBER |
|---|---|---|---|---|
| 91 | 550 | — | CURRENTLY-GENERATED NEW PROCESS | 2 |
| 89 | 552 | 567 | 8628 | 9 |
| 99 | 543 | 552 | 4293 | 9 |
| 100 | 542 | 540 | 6553 | 4 |
| 106 | 538 | 531 | 5706 | 2 |

FIG.15

| # | MACHINING TYPE | TOOL TO BE USED | MACHINING CONDITION |
|---|---|---|---|
| 1 | FACING | FACING TURNING 1 | CONDITION 1 |
| 2 | OUTER-DIAMETER TURNING | OUTER-DIAMETER TURNING 1 | CONDITION 2 |
| 3 | OUTER-DIAMETER TURNING | OUTER-DIAMETER TURNING 1 | CONDITION 3 |
| 4 | OUTER-DIAMETER GROOVING | OUTER-DIAMETER GROOVING 1 | CONDITION 4 |

FIG.17

| PROCESS BACKGROUND INFORMATION |
|---|
| PROCESS GENERATION METHOD: COLLECT PAST INSTANCES SIMILAR TO MACHINING TARGET, AND SELECT MOST FREQUENTLY-USED PROCESS TYPE FROM AMONG COLLECTED PAST INSTANCES |

CURRENT MACHINING TARGET
- MATERIAL TYPE: A5052
- PRODUCT OUTER-SHAPE DIMENSION RATIO (L/R): 1.94=(=46.50/90.00)
- INITIAL MACHINING: FACING

PROCESS

| # | MACHINING TYPE | TOOL TO BE USED | MACHINING CONDITION |
|---|---|---|---|
| 1 | FACING | FACING TURNING 1 | CONDITION 1 |
| 2 | OUTER-DIAMETER TURNING | OUTER-DIAMETER TURNING 1 | CONDITION 2 |
| 3 | OUTER-DIAMETER TURNING | OUTER-DIAMETER TURNING 1 | CONDITION 3 |
| 4 | OUTER-DIAMETER GROOVING | OUTER-DIAMETER GROOVING 1 | CONDITION 4 |

INSTANCE 9852
- MATERIAL TYPE: A5052
- PRODUCT OUTER-SHAPE DIMENSION RATIO (L/R): 2.00=(=45.00/90.00)
- INITIAL MACHINING: FACING

PROCESS

| # | MACHINING TYPE | TOOL TO BE USED | MACHINING CONDITION |
|---|---|---|---|
| 1 | FACING | FACING TURNING 1 | CONDITION 1 |
| 2 | OUTER-DIAMETER TURNING | OUTER-DIAMETER TURNING 1 | CONDITION 2 |
| 3 | OUTER-DIAMETER GROOVING | OUTER-DIAMETER GROOVING 1 | CONDITION 3 |

FIRST-MACHINABLE REGION
- FACING

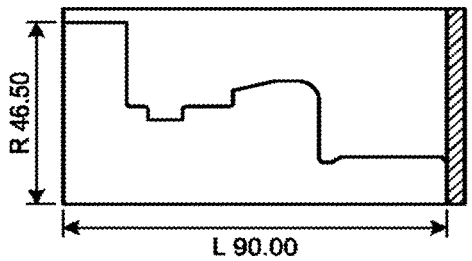

- OUTER-DIAMETER TURNING

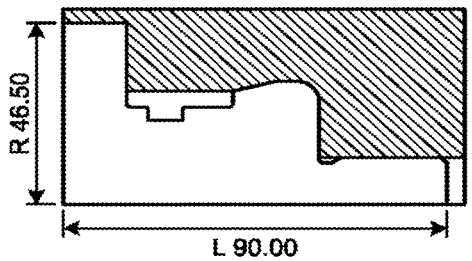

FIRST-MACHINABLE REGION
- FACING

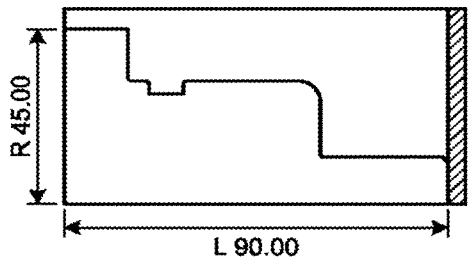

- OUTER-DIAMETER TURNING

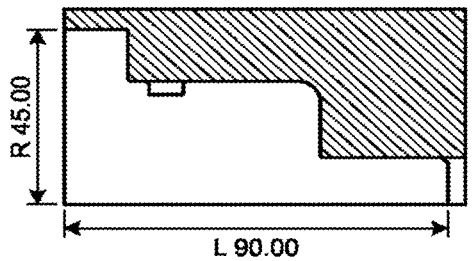

FIG.22

ALREADY-GENERATED MACHINING PROCESS

| MACHINING NUMBER | MACHINING METHOD | TOOL TO BE USED | MACHINED SHAPE | MACHINING CONDITION |
|---|---|---|---|---|
| 1 | | | | |

MACHINING-METHOD SELECTION CANDIDATES AND BACKGROUND INFORMATION

| | MACHINING METHOD | CANDIDATE GENERATION METHOD | BACKGROUND INFORMATION |
|---|---|---|---|
| CANDIDATE 1 | FACING | FACING | INSTANCES WITH CODE OF RAW-MATERIAL TYPE A5052 HAVE BEEN EXTRACTED. MOST SIMILAR INSTANCE: 2609 |
| CANDIDATE 2 | OUTER DIAMETER TURNING | DISCRIMINANT ANALYSIS | INSTANCES WHOSE RAW-MATERIAL TYPE IS ALUMINUM ALLOY WITH CODE IN 5000S HAVE BEEN EXTRACTED. INSTANCE CLOSEST TO CURRENTLY-GENERATED PROCESS IN OUTER-DIAMETER TURNING GROUP: 9174 |

FIG.23

BACKGROUND INFORMATION
- PROCESS GENERATION METHOD: EXTRACT INSTANCES AND ESTIMATE BY DISCRIMINANT ANALYSIS
- INSTANCE EXTRACTION CONDITIONS
  - RAW-MATERIAL TYPE    ALUMINUM ALLOY WITH CODE IN 5000S
  - AVAILABLE MACHINING   EITHER OF TWO TYPES, FACING OR OUTER-DIAMETER TURNING

| | AXIAL LENGTH | RADIAL LENGTH | MACHINING METHOD | INSTANCE NUMBER | MACHINING NUMBER |
|---|---|---|---|---|---|
| | 80 | 60 | FACING | CURRENTLY-GENERATED NEW PROCESS | 1 |
| CENTER OF FACING GROUP | 90 | 50 | FACING | 1078 | 1 |
| INSTANCE CLOSEST TO CURRENTLY-GENERATED PROCESS IN FACING GROUP | 84 | 55 | FACING | 3213 | 1 |
| CENTER OF OUTER-DIAMETER TURNING GROUP | 50 | 65 | OUTER-DIAMETER TURNING | 1217 | 1 |
| INSTANCE CLOSEST TO CURRENTLY-GENERATED PROCESS IN OUTER-DIAMETER TURNING GROUP | 70 | 52 | OUTER-DIAMETER TURNING | 9174 | 1 |

FIG.25

ALREADY-GENERATED MACHINING PROCESS

| MACHINING NUMBER | MACHINING METHOD | TOOL TO BE USED | MACHINED SHAPE | MACHINING CONDITION |
|---|---|---|---|---|
| 1 | | | | |

MACHINING-METHOD SELECTION CANDIDATES AND BACKGROUND INFORMATION

| | MACHINING METHOD | CANDIDATE GENERATION METHOD | BACKGROUND INFORMATION |
|---|---|---|---|
| CANDIDATE 1 | FACING | FACING | INSTANCES WITH CODE OF RAW-MATERIAL TYPE A5052 HAVE BEEN EXTRACTED. MOST SIMILAR INSTANCE: 2609 |
| CANDIDATE 2 | OUTER DIAMETER TURNING | DISCRIMINANT ANALYSIS | INSTANCES WHOSE RAW-MATERIAL TYPE IS ALUMINUM ALLOY WITH CODE IN 5000S HAVE BEEN EXTRACTED. INSTANCE CLOSEST TO CURRENTLY-GENERATED PROCESS IN FACING GROUP: 3213 |

FIG.26

ALREADY-GENERATED MACHINING PROCESS

| MACHINING NUMBER | MACHINING METHOD | TOOL TO BE USED | MACHINED SHAPE | MACHINING CONDITION |
|---|---|---|---|---|
| 1 | OUTER DIAMETER TURNING | FACING TURNING 2 | REGION 31 | |

CUTTING-SPEED SELECTION CANDIDATES AND BACKGROUND INFORMATION

| | CUTTING SPEED | CANDIDATE GENERATION METHOD | BACKGROUND INFORMATION |
|---|---|---|---|
| CANDIDATE 1 | 550 | REGRESSION ANALYSIS | INSTANCES WITH CODE OF RAW-MATERIAL TYPE A5052 AND USING OUTER-DIAMETER TURNING HAVE BEEN EXTRACTED. MOST SIMILAR INSTANCE: 8628 |
| CANDIDATE 2 | 560 | OPERATION HISTORY | 2012/3/4 12:34 CUTTING SPEED IN INSTANCE 1234 HAS BEEN CHANGED. |

MACHINING-PROCESS GENERATION DEVICE, AND MACHINING-PROCESS GENERATION METHOD

FIELD

The present invention relates to a machining-process generation device to generate a machining process for machining a raw material to obtain a product, a machining-process generation method for generating the machining process, and a program to generate the machining process.

BACKGROUND

When a raw material is machined using a machining device to manufacture a product, a machining process to be performed by the machining device is designed prior to creating a computer program for controlling the machining device. For the purpose of generating this machining process more efficiently, a technique has been developed to generate a machining process automatically from data on a raw-material shape and a product shape.

Patent Literature 1 discloses a method for generating a machining process using an expert system. The expert system is a system using artificial intelligence. The system makes inferences using a group of rules and analyzes problems arising in a specific field. In the method disclosed in Patent Literature 1, a group of rules is constituted by a plurality of rules on the basis of the law between manufacturing conditions and product specifications and on the basis of empirical rules. The expert system uses the rules each indicating a relation between a condition A and a fact B derivable when the condition A is satisfied. In the method disclosed in Patent Literature 1, after a machining process is generated, rules that have been used from the step of inputting product specifications to the step of generating the machining process are displayed and provided to a worker.

CITATION LIST

Patent Literature

Patent Literature 1: Japanese Patent Application Laid-open No. H05-269646

SUMMARY

Technical Problem

For the conventional technique described above, unfortunately, displayed information includes special rules used in the expert system, and a worker is required to understand the special rules. The use of such rules poses a problem of a worker having difficulty in confirming the adequacy of the generated machining process. Another problem with the conventional technique described above is that, in order to reflect a change to the machining process on the subsequent machining-process generation, it is necessary to edit a group of rules manually in consideration of what kind of rules are needed, which requires much time and effort.

The present invention has been achieved to solve the above problems, and an object of the present invention is to provide a machining-process generation device that enables easy confirmation of the adequacy of a machining process, the machining-process generation device being capable of reflecting a change to the machining process on the subsequent machining-process generation without requiring much time and effort.

Solution to Problem

To solve the above problems and achieve the object, the present invention provides a machining-process generation device comprising: a process-instance storage section to store therein a process instance that is an instance of a machining process indicating machining details of each machining-operation unit; a process generation section to generate the machining process on a basis of the process instance and a generation condition for the machining process, and to generate background information indicating a background to generation of the machining process, the background information including information in which a constituent part of the generated machining process is associated with a part of the process instance, the part of the process instance having been used to generate the constituent part; and a display section capable of displaying the background information on a display device.

Advantageous Effects of Invention

According to the present invention, there is an effect where it is possible to easily confirm the adequacy of a machining process, and to reflect a change to the machining process on the subsequent machining-process generation without requiring much time and effort.

BRIEF DESCRIPTION OF DRAWINGS

FIG. 8 is a diagram illustrating an example of an outer-diameter-turning-machined shape calculated by the machining-process generation device illustrated in FIG. 1.

FIG. 9 is a diagram illustrating an example of background information stored in a background-information storage unit illustrated in FIG. 1.

FIG. 12 is a diagram illustrating an example of background information regarding a machining method displayed by the machining-process generation device illustrated in FIG. 1.

FIG. 13 is a diagram illustrating a comparative example between a new process and a process instance displayed by the machining-process generation device illustrated in FIG. 1.

FIG. 14 is a diagram illustrating an example of background information regarding a machining condition displayed by the machining-process generation device illustrated in FIG. 1.

FIG. 15 is a diagram illustrating an example of a generated machining process displayed by the machining-process generation device illustrated in FIG. 1.

FIG. 17 is a diagram illustrating a comparative example between a new process and background information displayed by the machining-process generation device illustrated in FIG. 1.

FIG. 22 is a diagram illustrating an example of candidates for a process part displayed by the machining-process generation device illustrated in FIG. 19.

FIG. 23 is a diagram illustrating an example of background information displayed by the machining-process generation device illustrated in FIG. 19.

FIG. 25 is a diagram illustrating an example of candidate machining methods and background information displayed by the machining-process generation device illustrated in FIG. 24.

FIG. 26 is a diagram illustrating an example of candidate machining conditions and background information displayed by the machining-process generation device illustrated in FIG. 24.

DESCRIPTION OF EMBODIMENTS

A machining-process generation device, a machining-process generation method, and a program according to embodiments of the present invention will be described in detail below with reference to the accompanying drawings. The present invention is not limited to the embodiments.

First Embodiment

Figure 1:
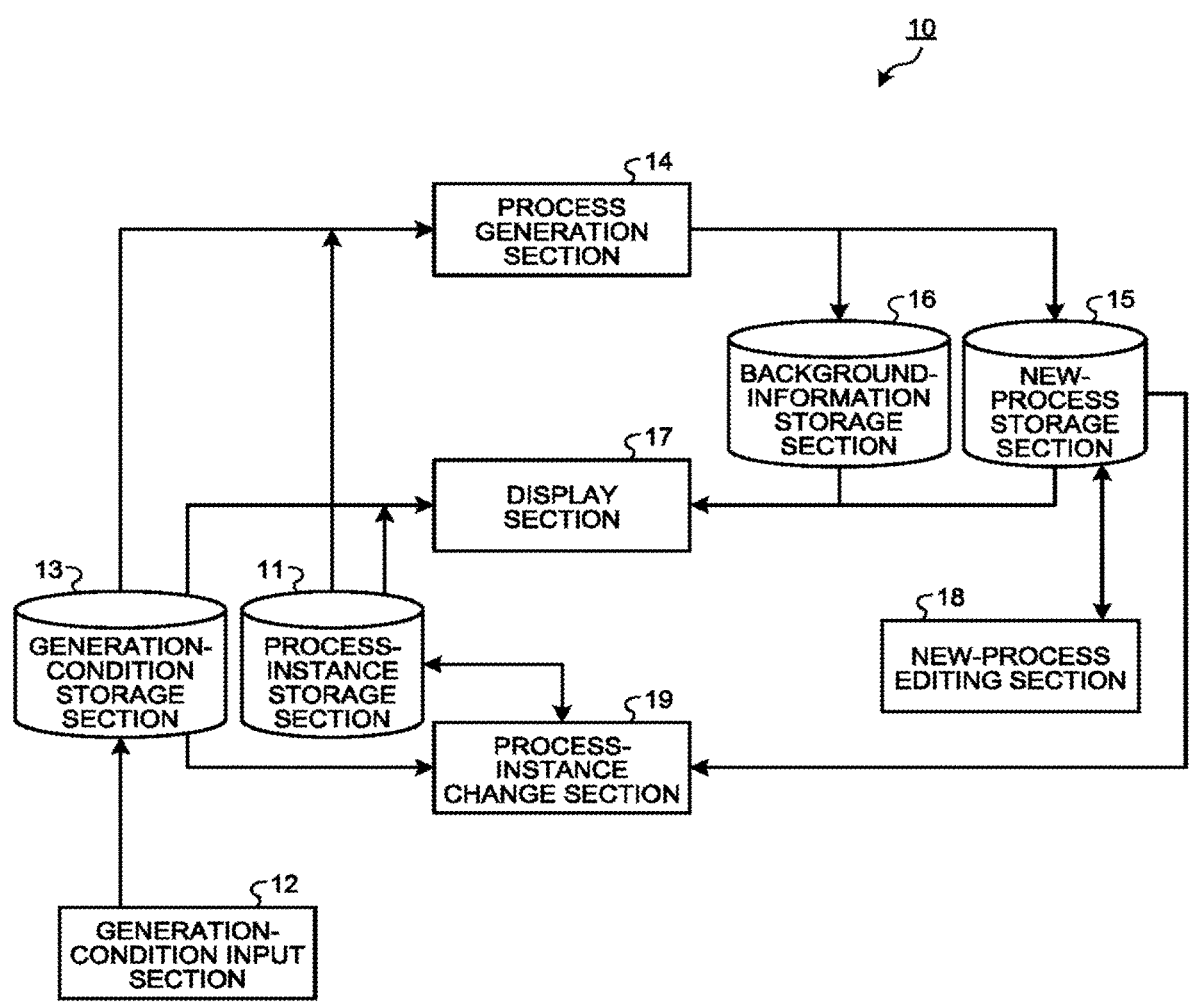
FIG. 1 is a functional configuration diagram of a machining-process generation device according to a first embodiment.

FIG. 1 is a functional configuration diagram of a machining-process generation device according to a first embodiment. A machining-process generation device 10 illustrated in FIG. 1 includes a process-instance storage section 11, a generation-condition input section 12, a generation-condition storage section 13, a process generation section 14, a new-process storage section 15, a background-information storage section 16, a display section 17, a new-process editing section 18, and a process-instance change section 19.

The process-instance storage section 11 stores therein a plurality of process instances that are instances of machining processes generated in the past. Each of the process instances includes a machining process and a machining-process generation condition. More specifically, the process instance includes, as the machining process, machining-operation unit data and a sequence of executing the machining-operation unit data. The machining-operation unit data indicates details of each machining-operation unit. The process instance also includes, as the generation condition, information that indicates a product shape, a raw-material shape, and a raw-material type as well as a tool and a machine to be used for machining. The process instance may further include information regarding the name of a process creator, the date and time of creation of the process, and a product manufactured using the process.

The generation-condition input section 12 receives a generation condition for generating a machining process and stores the received generation condition in the generation-condition storage section 13. An input generation condition is, for example, information indicating a product shape, a raw-material shape, and a raw-material type as well as a tool and a machine to be used for machining. The generation-condition storage section 13 stores therein the generation condition received by the generation-condition input section 12.

Data on the product-shape and raw-material shape, which is included in the process instance and the generation condition, includes the type, coordinates, and dimensions of the shape elements of the respective contour shapes of the product and the raw material. It is also allowable that the generation-condition input section 12 receives a generation condition which a worker inputs using an input device such as a keyboard. Alternatively, the generation-condition input section 12 can convert input CAD (Computer Aided Design) data into a generation condition, thereby receiving the generation condition.

The process generation section 14 generates a machining process on the basis of the generation condition and the process instance. The generation condition is stored in the generation-condition storage section 13. The process instance is stored in the process-instance storage section 11. The process generation section 14 stores, in the new-process storage section 15, a new process that is a generated machining process. In generating a machining process, the process generation section 14 further generates background information that indicates which part of the process instance has been used for generating which part of the machining process. Examples of the generation method, which the process generation section 14 uses in generating a machining process, include machine learning, frequency, shape analysis, and database retrieval. In accordance with the method used to generate a machining process and characteristics of the generated machining process, the process generation section 14 can change contents of the background information to be generated. For example, in a case where the process generation method is the machine learning, the background information may be typical learning data with the highest similarity to a generated machining process. For example, in a case where the process generation section 14 uses a value that occurs with a high frequency in process instances extracted from among the process instances, the background information can include the extracted process instances and a condition for extracting these process instances. When the process generation section 14 generates a machining process using shape analysis, the process generation section 14 can generate the background information that is information indicating a machining region selectable in the machining process. In a case where a generated portion of the machining process is a milling process, the process generation section 14 can represent a machined shape in a three dimensional display. In a case where a generated portion of the machining process is a turning process, the process generation section 14 can represent a machined shape in a two dimensional display. It is desirable that contents of the background information be easy to understand for a worker having no prior knowledge. For example, a parameter and the like that are used in a specific process-generation algorithm are undesirable for the background information. A worker who generates a machining process is more likely to have knowledge on the machining process itself. Thus, in a case where a machining process is generated using an instance of the machining process generated in the past, it is desirable that the background information indicates which instance has been used and which part of the instance has been used. The process generation section 14 stores the generated background information in the background-information storage section 16.

The display section 17 displays various types of information on a screen of a display device. By using a process instance stored in the process-instance storage section 11, a generation condition stored in the generation-condition storage section 13, a machining process stored in the new-process storage section 15, and background information stored in the background-information storage section 16, for example, the display section 17 can generate information to be displayed on the screen. The display section 17 can display background information. At this time, the display section 17 can convert the background information into a format which help a worker to easily understand the background information, and then can display the background information in this format. The display section 17 converts background information into at least any of text, table, and diagram to display the background information. A specific example of the background information displayed by the display section 17 is described hereinafter.

The new-process editing section 18 receives instructions input by a worker using the input device. In accordance with the received instructions, the new-process editing section 18 changes a machining process stored in the new-process storage section 15. The new-process editing section 18 stores the changed machining process in the new-process storage section 15.

The process-instance change section 19 makes a change such as addition of, deletion of, and editting of a process instance stored in the process-instance storage section 11. After the process generation section 14 generates a new machining process, the process-instance change section 19 obtains a generation condition of the generated machining process from the generation-condition storage section 13, and combines the obtained generation condition with the machining process stored in the new-process storage section 15 to thereby a new process instance. The process-instance change section 19 stores the new process instance in the process-instance storage section 11.

Figure 2:
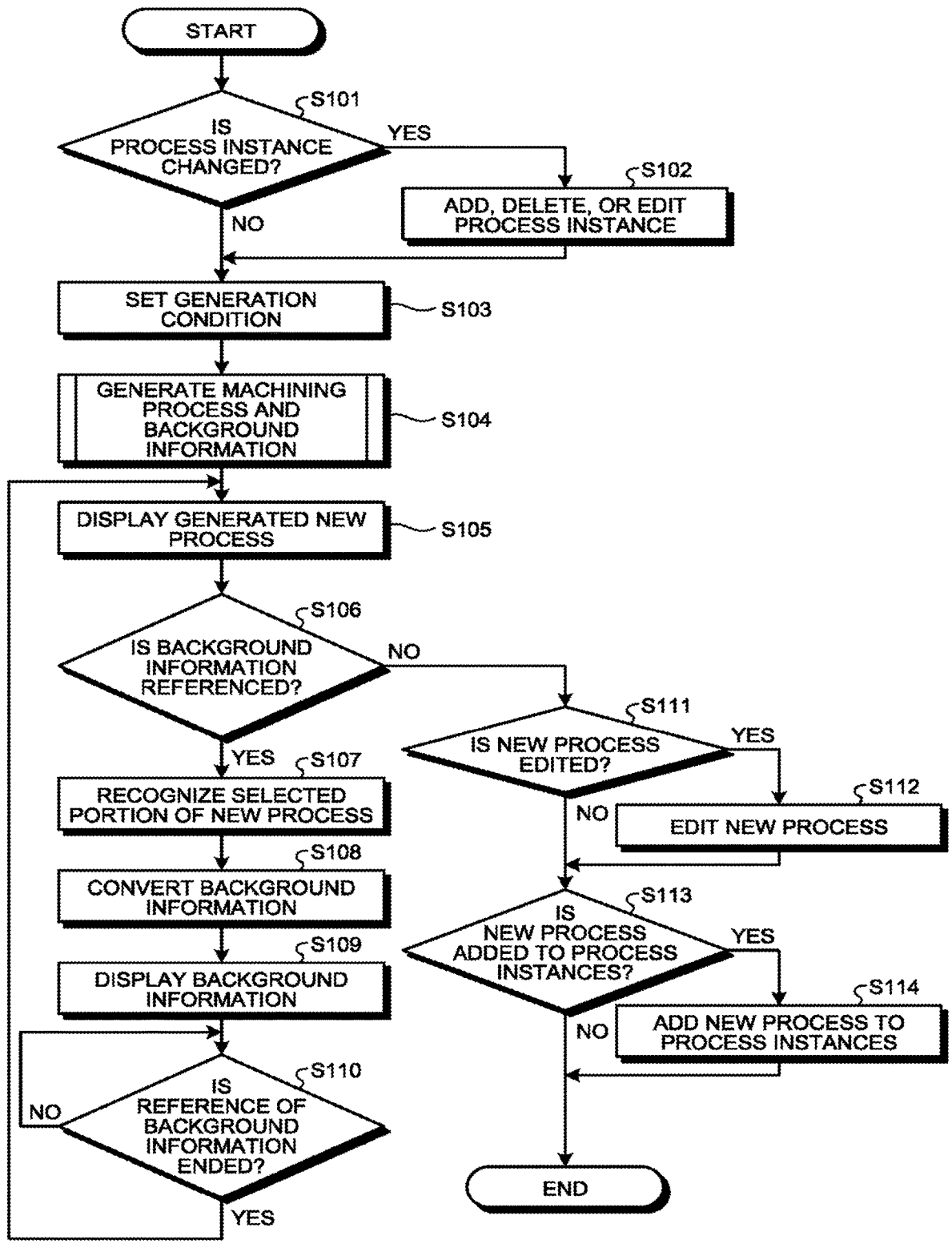
FIG. 2 is a flowchart illustrating an operation of the machining-process generation device illustrated in FIG. 1.
Figure 3:
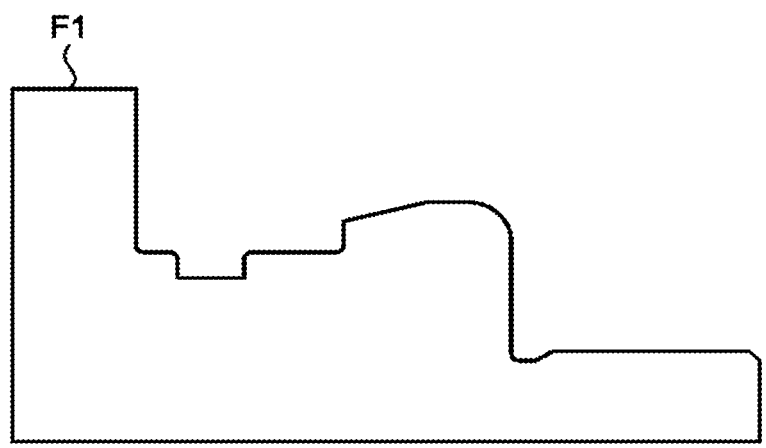
FIG. 3 is a diagram illustrating an example of a product shape input to the machining-process generation device illustrated in FIG. 1.
Figure 4:
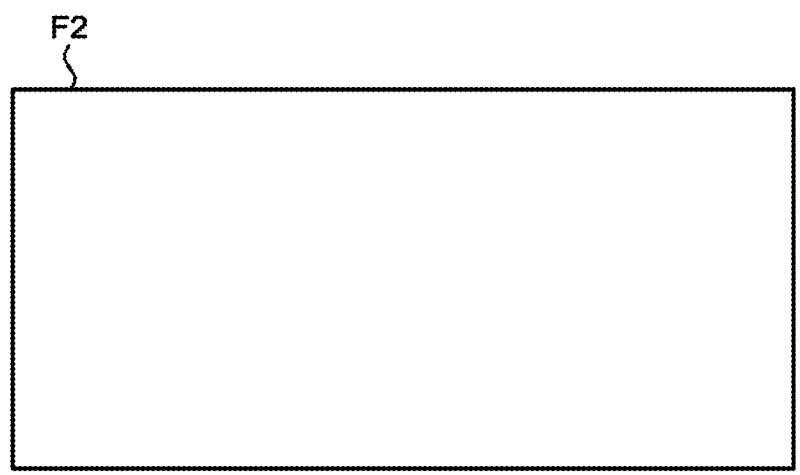
FIG. 4 is a diagram illustrating an example of a raw-material shape input to the machining-process generation device illustrated in FIG. 1.

FIG. 2 is a flowchart illustrating an operation of the machining-process generation device illustrated in FIG. 1. The process-instance change section 19 in the machining-process generation device 10 determines whether to change a process instance on the basis of whether there are change instructions from a worker using an input device (not illustrated) (Step S101). When there are change instructions, the process-instance change section 19 determines to change a process instance (YES at Step S101), and performs at least any of addition, deletion, and editing of a process instance stored in the process-instance storage section 11 (Step S102). In a case where there is no process instance stored in the process-instance storage section 11, the worker needs to add a process instance. After the process-instance change section 19 has changed the process instance, or when there are no change instructions and thus the process-instance change section 19 determines not to change a process instance (NO at Step S101), a generation condition is set (Step S103). When the generation-condition input section 12 receives a generation condition, the generation-condition input section 12 stores the received generation condition in the generation-condition storage section 13, thereby setting the generation condition. Specifically, when a code of raw-material type "A5052", a product shape F1 illustrated in FIG. 3, and a raw-material shape F2 illustrated in FIG. 4, which are generation conditions, are input to the generation-condition input section 12, the generation-condition input section 12 stores the input generation conditions in the generation-condition storage section 13. FIG. 3 is a diagram illustrating an example of a product shape input to the machining-process generation device illustrated in FIG. 1. FIG. 4 is a diagram illustrating an example of a raw-material shape input to the machining-process generation device illustrated in FIG. 1.

Subsequently, the process generation section 14 uses the generation conditions stored in the generation-condition storage section 13 and the process instance stored in the process-instance storage section 11 to generate a machining process and background information (Step S104).

Figure 5:
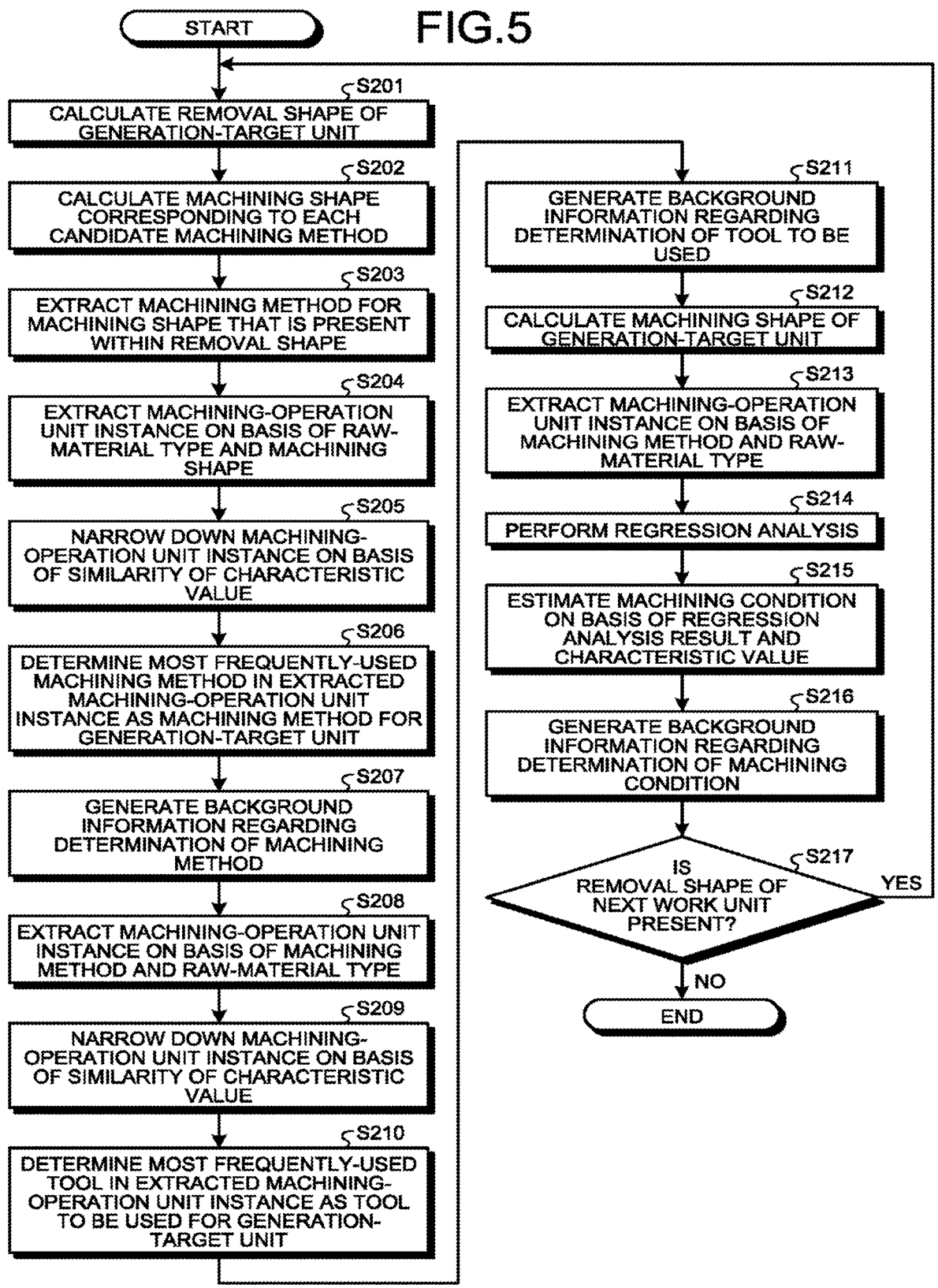
FIG. 5 is a flowchart for explaining generation of a machining process and background information according to the first embodiment.

With reference to FIG. 5, Step S104 in FIG. 2 is described in detail. FIG. 5 is a flowchart for explaining generation of a machining process and background information according to the first embodiment.

The machining process generated by the process generation section 14 is a list of pieces of machining-operation unit data that are arranged in the machining order. Each piece of the machining-operation unit data indicates details of each machining-operation unit. The "machining-operation unit" is, for example, defined as a "unit" that means a series of machining operations performed using a single tool continuously. The process generation section 14 generates machining-operation unit data one by one from a first machining-operation unit in the machining order. In the repetition of generation of machining-operation unit data, a machining-operation unit, which has already started being generated, but has not yet been completely generated, is referred to as "generation-target unit". When the process generation section 14 generates a piece of machining-operation unit data, the process generation section 14 determines data on the machining method, on the tool to be used, on the machining shape, and on the machining condition in that order.

Figure 6:
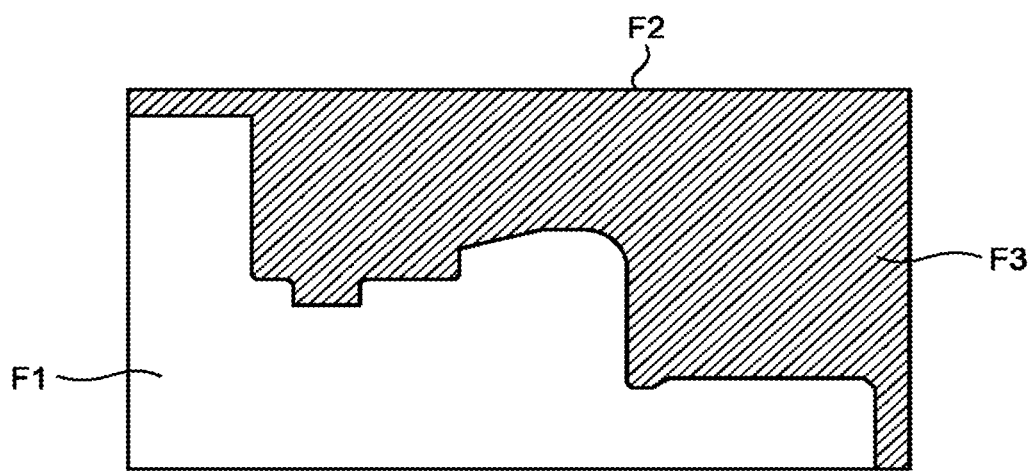
FIG. 6 is a diagram illustrating an example of a removal shape calculated by the machining-process generation device illustrated in FIG. 1.

The process generation section 14 calculates a removal shape for a generation-target unit (Step S201). The removal shape is a shape of a portion removed from a raw material by machining. In this example, the removal shape for a certain machining-operation unit refers to a shape that exists immediately before undergoing this machining-operation unit. An initial value of the removal shape indicates a shape of the raw-material having a product shape removed. The removal shape for the first machining-operation unit is defined as the initial value of the removal shape. FIG. 6 is a diagram illustrating an example of the removal shape calculated by the machining-process generation device illustrated in FIG. 1. In FIG. 6, a hatched portion indicates the initial value of the removal shape F3. The shape of the hatched portion matches a portion obtained by removing the product shape F1 illustrated in FIG. 3 from the raw-material shape F2 illustrated in FIG. 4. Removing the shape machined by the first machining-operation unit from the initial value of the removal shape provides a removal shape for a second machining-operation unit. The machined shape is a shape of a portion to be machined by each machining-operation unit.

Subsequently, the process generation section 14 calculates a machined shape corresponding to each of a plurality of candidates for machining methods, assuming that such machining methods are carried out (Step S202). The process generation section 14 determines whether each of the calculated machined shapes is present within the removal shape calculated at Step S201, and extracts a machining method corresponding to the machined shape having been determined to be present within the removal shape for the generation-target unit (Step S203).

Some machining method provides the machined shape calculated at Step S202, which is not present within the removal shape. For example, providing a product having the product shape F1 does not require inner-diameter turning. For the product shape F1, thus, there does not exist a machined shape corresponding to the inner-diameter turning. The machining method, which corresponds to such a non-existent machined shape, is not among the machining methods extracted at Step S203 because it is not possible to determine whether the machined shape is present within the removal shape at Step S203. For the product shape F1, that is, a result of the extraction does not include the inner-diameter turning.

Figure 7:
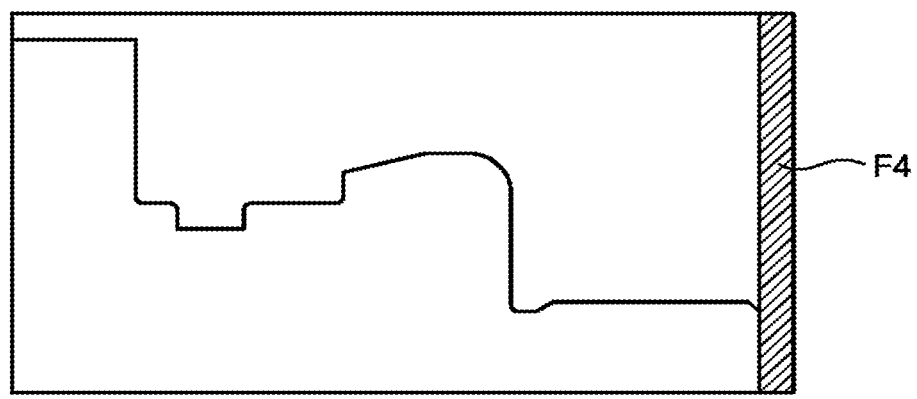
FIG. 7 is a diagram illustrating an example of a facing-machined shape calculated by the machining-process generation device illustrated in FIG. 1.

FIG. 7 is a diagram illustrating an example of a facing-machined shape calculated by the machining-process generation device illustrated in FIG. 1. FIG. 8 is a diagram illustrating an example of an outer-diameter-turning-machined shape calculated by the machining-process generation device illustrated in FIG. 1. A machined shape F4 illustrated in FIG. 7 is calculated assuming that the facing is performed in the first machining-operation unit. A machined shape F5 illustrated in FIG. 8 is calculated assuming that the outer-diameter turning is performed in the first machining-operation unit. Of plural candidates for the machining methods, in this example, the facing and the outer-diameter turning are extracted as the candidates for the machining methods for the first machining-operation unit, because the machined shape F4 corresponding to the facing and the machined shape F5 corresponding to the outer-diameter turning are both present within the removal shape F3. In this case, the types of machining method are the facing and the outer-diameter turning, and the number of machining methods is two.

In some case, a single machining process includes a plurality of machining-operation units with the same machining method. For example, a machining process for machining a raw material into a product shape having a plurality of grooves includes a plurality of machining-operation units for grooving. The process generation section 14 extracts a process instance from among the process instances stored in the process-instance storage section 11, defining a machining-operation unit as a single unit of extraction. In the following descriptions, a machining-operation unit included in a process instance is referred to as "machining-operation unit instance", and extracting a process instance on a per machining-operation unit basis is expressed as "extracting a machining-operation unit instance".

The process generation section 14 calculates a removal shape for each of the machining-operation unit instances stored in the process-instance storage section 11, and extracts a machining-operation unit instance in which: the type and the number of machining methods selected on the basis of the calculated removal shapes match those of a machining process being generated; and the raw-material type matches that of the machining process being generated (Step S204). At this time, the process generation section 14 extracts a machining-operation unit instance in which the type and the number of machining methods match those of a generation-target unit. Of the machining-operation unit instances stored in the process-instance storage section 11, more specifically, a machining-operation unit instance in which the type of machining method is "facing and outer-diameter turning", the number of machining methods is "two", and the code of raw-material type is "A5052" is extracted by the process generation section 14. In a case where the number of extracted machining-operation unit instances does not reach a predetermined number, it is allowable that the extraction condition for the raw-material type is eased to extract a machining-operation unit instance with a similar raw-material type as well as the matching raw-material type. For example, the process generation section 14 can reduce the degree of similarity of the raw-material type until the number of extracted machining-operation unit instances reaches a predetermined number. For example, in a case where a code indicating the raw-material type is set in accordance with the similarity, the process generation section 14 can use this code to ease the extraction condition for the raw-material type. In a case where the number of machining-operation unit instances with the code of raw-material type "A5052" does not reach a predetermined number, the process generation section 14 eases the extraction condition for the raw-material type in such a manner as to extract a machining-operation unit instance in which the first four digits of the code of raw-material type match those of "A5052". That is, the process generation section 14 extracts machining-operation unit instances with the code of raw-material type "A5050" to "A5059". In a case where the number of machining-operation unit instances with the code of raw-material type "A5050" to "A5059" does not reach a predetermined number, the process generation section 14 further eases the extraction condition for the raw-material type in such a manner as to extract a machining-operation unit instance in which the first three digits of the code of raw-material type match those of "A5052". That is, the process generation section 14 extracts machining-operation unit instances with the code of raw-material type "A5000" to "A5099". As the number of matching digits of the code becomes smaller, the similarity of the raw-material type becomes lower. Accordingly, the extraction condition for the raw-material type is eased.

The process generation section 14 calculates a characteristic value of a generation-target unit and of each of the extracted machining-operation unit instances, and narrows down the machining-operation unit instances on the basis of the similarity of the characteristic value (Step S205). What kind of characteristic value is used and a method for calculating the characteristic value as well as a method for calculating the similarity between the characteristic values are preset in accordance with the type and the number of machining methods selected for a generation-target unit. The process generation section 14 narrows down the machining-operation unit instances to a predetermined number in the descending order of similarity. For example, in a case where there are two types of machining method: the facing and the outer-diameter turning, the characteristic value includes an axial length of a cylindrical shape enclosing a product shape and a radial length of the cylindrical shape, while a similarity index value is the sum of the square of the difference in the axial length and the square of the difference in the radial length. For example, assume that a generation-target unit has an axial length of 80 mm and a radial length of 60 mm. In this case, the process generation section 14 calculates an axial length and a radial length in each of the extracted process instances, and adds the square of a value, obtained by subtracting 80 from the calculated axial length, and the square of a value, obtained by subtracting 60 from the calculated radial length, to thereby calculate a similarly index value between each machining-operation unit instance and the generation-target unit. The process generation section 14 then extracts a predetermined number of machining-operation unit instances in the descending order of similarity, for example, extracts ten machining-operation unit instances. In the above example, as the similarity becomes higher, the similarity index value becomes smaller. Thus, the ten machining-operation unit instances are extracted in the ascending order of similarity index value.

The process generation section 14 determines that the most frequently-used one of the machining methods in the machining-operation unit instances extracted from the process-instance storage section 11 is a machining method for the generation-target unit (Step S206). For example, in a case where 9 out of 10 extracted machining-operation unit instances use the machining method "facing", while the remaining one uses the machining method "outer-diameter turning", then the process generation section 14 determines that the machining method for the generation-target unit unit is "facing".

The process generation section 14 generates background information regarding the determination of the machining method and stores the generated background information in the background-information storage section 16 (Step S207). FIG. 9 is a diagram illustrating an example of background information stored in the background-information storage unit illustrated in FIG. 1. The process generation section 14 generates background information that indicates some of the process instances, which have been used in performing Steps S201 to S206, and how the process instances have been used. The background information illustrated in FIG. 9 includes conditions for extracting a process instance, and information indicating how the extracted process instance has been used, specifically, information indicating that the most frequently-used machining method has been selected. This background information further includes the instance number of the extracted process instance, the machining-operation unit number, the machining method, the similarity index value calculated corresponding to each process instance, the axial length, and the radial length, the axial length and the radial length being the characteristics used to calculate the similarity index value.

When the machining method is determined, then the process generation section 14 determines a tool to be used. On the basis of the machining method and the raw-material type, the process generation section 14 extracts a machining-operation unit instance from among the process instances stored in the process-instance storage section 11 (Step S208). From among the process instances stored in the process-instance storage section 11, the process generation section 14 extracts a machining-operation unit instance with the same machining method and the same raw-material type as those of the generation-target unit. Specifically, the process generation section 14 extracts a machining-operation unit instance with the machining method, the facing, and the code of raw-material type A5052. In a case where the number of extracted machining-operation unit instances does not reach a predetermined number, the extraction condition for the raw-material type is eased to the range of similar raw-material types such that the number of extracted machining-operation unit instances exceeds the predetermined number.

On the basis of the similarity of the characteristic value, the process generation section 14 further narrows down the machining-operation unit instances extracted at Step S208 (Step S209). The characteristic value used at Step S209, a method for calculating the characteristic value, and a method for calculating a similarity index value between the characteristic values are preset in accordance with the machining method. The process generation section 14 extracts a predetermined number of machining-operation unit instances in the descending order of similarity of the characteristic value.

The process generation section 14 determines that a most frequently used tool in a population defined by the extracted machining-operation unit instances is a tool to be used for the generation-target unit (Step S210).

The process generation section 14 generates background information regarding the determination of the tool to be used, and stores the generated background information in the background-information storage section 16 (Step S211). For example, the background information includes information that indicates conditions for extracting a machining-operation unit instance, the machining-operation unit number of the extracted machining-operation unit instance, the process-instance number, and the similarity of the machining-operation unit.

Once the machining method and the tool to be used for the generation-target unit are determined in the manner as described above, the process generation section 14 calculates a shape that can be obtained using the determined machining method and the determined tool, on the basis of the removal shape for the generation-target unit, and determines the calculated shape as a machining shape for the generation-target unit (Step S212).

Once the machining method, the tool to be used, and the machining shape for the generation-target unit are determined, the process generation section 14 extracts a machining-operation unit instance from among the process instances stored in the process-instance storage section 11, on the basis of the machining method and the raw-material type (Step S213). More specifically, a machining-operation unit of the process instance with the machining method "facing" and the code of raw-material type "A5052" is extracted as a machining-operation unit instance by the process generation section 14. In a case where the number of extracted machining-operation unit instances does not reach a predetermined number, the extraction condition for the raw-material type is eased to the range of similar raw-material types such that the number of extracted machining-operation unit instances exceeds the predetermined number.

Next, the process generation section 14 calculates a characteristic value in each of the extracted machining-operation unit instances, defines the calculated characteristic value as an explanatory variable, and defines a machining condition, that is, the cutting speed in each machining-operation unit in this example, as an objective variable to perform regression analysis (Step S214).

The process generation section 14 calculates a characteristic value in the generation-target unit. Then, the process generation section 14 estimates a cutting speed, using this calculated characteristic value and a result of the regression analysis, and determines that the estimated cutting speed is a cutting speed for the generation-target unit (Step S215).

While in this example as described herein the machining condition is a cutting speed, a machining condition may be determined in addition to the cutting speed in which case the process generation section 14 uses the machining-operation unit instance extracted at Step S213 to repeat the processes at Steps S214 and S215. After all the machining conditions have been determined, the process generation section 14 generates background information regarding the determination of the machining conditions and stores the generated background information in the background-information storage section 16 (Step S216).

The above-described operation of the process generation section 14 generates new machining-operation unit data made up of the machining method, the tool to be used, the machining shape, and the machining conditions. The process generation section 14 removes the machined shape provided by a newly-generated machining unit, from a removal shape for the newly-generated machining unit and determines whether a removal shape for the next machining-operation unit is present (Step S217). Specifically, when a removal shape still remains even after the machined shape provided by the newly-generated machining-operation unit has been removed from the removal shape for the newly-generated machining-operation unit, the process generation section 14 can determine that a removal shape for the next machining-operation unit is present. When a removal shape for the next machining-operation unit is not present (NO at Step S217), the process generation section 14 ends the process.

When a removal shape for the next machining unit is present (YES at Step S217), the process generation section 14 repeats the processing from Step S201. Since the above description of the concrete example of the processing from Steps S201 to S213 is made for the first machining-operation unit, descriptions of the processing performed at these steps for the second machining-operation unit are omitted. The processing at Step S214 and the subsequent steps to be performed for the second machining-operation unit are described using a concrete example. In this example, it is determined that the machining method for the second machining-operation unit is "outer-diameter turning".

The process generation section 14 determines a cutting speed as the machining condition. A machining operation of the process instance with the machining method "outer-diameter turning" and the code of raw-material type "A5052" is extracted as a machining-operation unit instance by the process generation section 14 from among the process instances stored in the process-instance storage section 11 (Step S213).

The process generation section 14 calculates a characteristic value of each of the extracted machining-operation unit instances, defines the calculated characteristic value as an explanatory variable, and defines a machining condition, that is, the cutting speed in each machining-operation unit in this example, as an objective variable to perform regression analysis (Step S214). Specifically, the process generation section 14 calculates, on the basis of the machining shape, a removal volume as a characteristic value, the removal volume being the volume of a portion to be removed by each machining-operation unit.

Figures 10, 11:
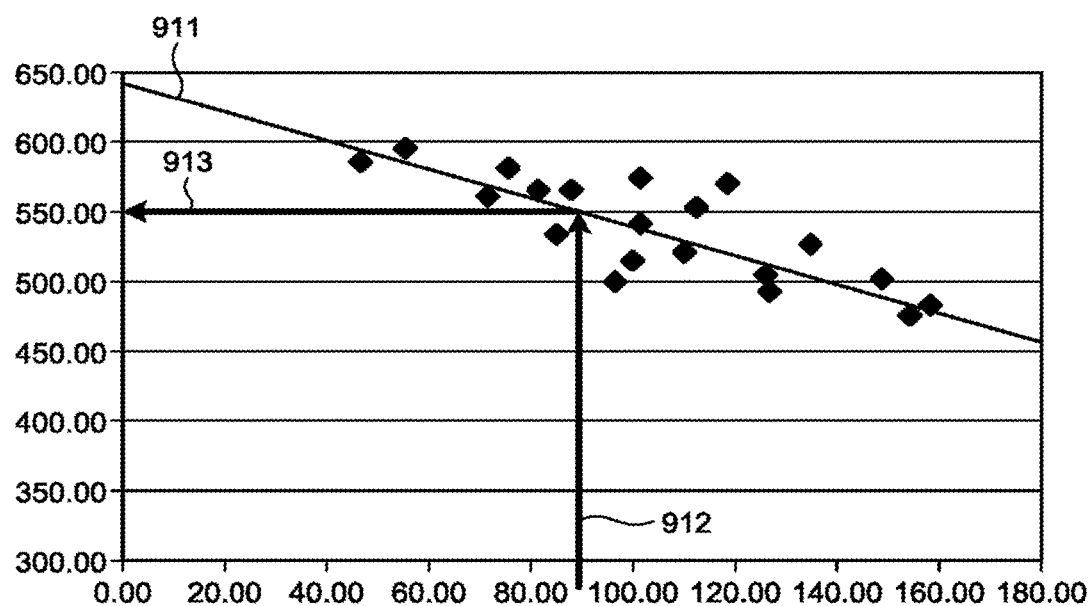
FIG. 10 is a diagram illustrating an example of regression analysis performed by the machining-process generation device illustrated in FIG. 1.
FIG. 11 is a diagram illustrating an example of a machining process generated by the machining-process generation device illustrated in FIG. 1.

FIG. 10 is a diagram illustrating an example of regression analysis performed by the machining-process generation device illustrated in FIG. 1. In FIG. 10, the horizontal axis represents a removal volume and the vertical axis represents a cutting speed. Each point illustrated in FIG. 10 shows an extracted machining-operation unit instance. A straight line 911 is a regression line. Subsequently, the process generation section 14 calculates a removal volume on the basis of the machined shape provided by a generation-target unit. Assume that the removal volume for the generation-target unit is 91.0 $cm^3$. An arrowed line 912 in FIG. 10 is a line extending vertically from a scale of 91.0 $cm^3$ on the horizontal axis and intersects the regression line. An arrowed line 913 extends horizontally from this point of intersection and intersects the vertical axis at a scale of 550 m/min. Accordingly, the process generation section 14 determines that the cutting speed of 550 m/min is a machining condition for the second machining-operation unit.

The process generation section 14 generates background information regarding the determination of the machining condition for the second machining-operation unit (Step S216). The background information regarding the machining condition for the second machining-operation unit includes: information indicating that linear regression analysis has been used; mathematical definition using the equation of a regression line that is a result of the linear regression analysis; the machining-operation unit number of a machining-operation unit used in the regression analysis, and the process-instance number of a process instance to which this machining-operation unit belongs. This background information further includes the conditions for extracting a machining-operation unit instance; the conditions are that the code of raw-material type is A5052 and the machining method for the machining unit is outer-diameter turning.

After having performed the processing at Steps S201 to S216 for the second machining-operation unit, the process generation section 14 determines whether a removal shape for the next machining-operation unit is present (Step S217). The processing described above is repeated until a removal shape for the next machining-operation unit is no longer present at Step S217.

Reference is made back to FIG. 2. When machining-operation unit data has been fully generated for up to the last machining-operation unit, and generation of the machining process and the background information has been completed, the display section 17 displays a new process that has been generated (Step S105). Because the newly-generated process has been stored in the new-process storage section 15, the display section 17 obtains the new process from the new-process storage section 15 and displays this new process.

FIG. 11 is a diagram illustrating an example of a machining process generated by the machining-process generation device illustrated in FIG. 1. The machining process illustrated in FIG. 11 includes three pieces of machining-operation unit data on three machining-operation units, the data indicating the machining details of each machining-operation unit. Each machining-operation unit data includes information that indicates the machining method, the tool to be used, the machining shape, and the machining condition. The display section 17 displays the machining process in such a manner that a worker can select each item of the machining-operation unit data.

Reference is made back to FIG. 2. On the basis of whether a worker performs a selection operation on a displayed new process, the display section 17 determines whether the background information is referenced (Step S106). Specifically, when the worker performs the selection operation, the display section 17 determines that the background information is referenced. When the worker does not perform the selection operation, the display section 17 determines that the background information is not referenced.

When the worker selects a target in respect of which the background information is to be referenced (YES at Step S106), the display section 17 recognizes the selected portion of the new process (Step S107). The display section 17 obtains background information on the recognized portion from the background-information storage section 16, and converts the obtained background information into a display format (Step S108). The display section 17 then displays the background information in the display format (Step S109).

FIG. 12 is a diagram illustrating an example of background information regarding the machining method displayed by the machining-process generation device illustrated in FIG. 1. When a worker selects a machining method for the first machining-operation unit, the selected machining method being a target in respect of which the background information is to be referenced, the display section 17 obtains background information illustrated in FIG. 9 from among the background information stored in the background-information storage section 16. The display section 17 then converts the obtained background information into a display format to display this background information. The background information is converted into at least any of the text, table, and diagram formats such that a worker can easily understand the converted background information. It is desirable that the background information converted into a text, table, or diagram format is easy to understand intuitively by a worker.

The method for converting background information is predetermined. The display section 17 converts the obtained background information in accordance with this predetermined method to display the background information. For example, the predetermined conversion method is a method using a template. A text template to be displayed is prepared in advance. The template has a predetermined data insertion section into which data acquired from the obtained background information is inserted. In the example in FIG. 12, some words of the displayed text, "A5052", "either of the two types, facing or outer-diameter turning", and "facing (applicable to 9 out of 10 instances)", are inserted into the data insertion section. The other displayed text is fixed. On the basis of the predetermined method, the display section 17 can create a table using the background information stored in the background-information storage section 16. The display section 17 can insert information included in the background information stored in the background-information storage section 16, directly into the table, or insert a value and the like calculated on the basis of the background information stored in the background-information storage section 16, into the table. An instance list 901 included on the screen illustrated in FIG. 12 shows a currently-generated new process and process instances extracted in the course of determining a machining method in the machining process. Each of the process instances includes the instance number, the machining number of a target machining-operation unit in the corresponding one of the process instances, the machining method, and the axial length and the radial length, both of the lengths being a characteristic value used to narrow down the process instances. A statistics table 902 shows statistics information on the process instances illustrated in the instance list 901. The instance list 901 shows the process instances in the descending order of similarity to the currently-generated new process. The process instances included in the background information stored in the background-information storage section 16 are not necessarily arranged in the order of similarity. Thus, the display section 17 rearranges and displays the process instances in the descending order of similarity. The statistics table 902 includes statistics information calculated on the basis of a plurality of process instances illustrated in the instance list 901. Specifically, the statistics table 902 includes a process instance with a minimum axial length, a process instance with a maximum axial length, a process instance with a minimum radial length, and a process instance with a maximum radial length of the process instances shown in the instance list 901, and also includes an average value of the axial length and the radial length in all the process instances. The statistics information illustrated in FIG. 12 is merely an example. The statistics table 902 may also include a median, a variance, and other statistics values.

FIG. 13 is a diagram illustrating a comparative example between a new process and a process instance displayed by the machining-process generation device illustrated in FIG. 1. The instance number included in the background information illustrated in FIG. 12 is linked with a screen including the diagram illustrated in FIG. 13. This comparative diagram illustrates a process instance corresponding to the selected instance number and a generated machining process which are arranged side by side. The display section 17 can highlight, for both the process instance and the generated machining process, which part of the process instance has been used for generating which part of the machining process. In FIG. 13, a machining method for the first machining-operation unit of the currently-generated machining process is generated using information on the machining method for the first machining unit of the process instance with the instance number 9852. Accordingly, the machining method "facing" for the machining number 1 of the currently-generated machining process, and the machining method "facing" for the machining number 1 of the process instance with the instance number 9852 are both highlighted. It is further allowable that the display section 17 further highlights a common portion or a different portion between the currently-generated new process and the used process instance. For example, it is allowable that the display section 17 highlights the code of raw-material type "A5052" and the machining condition "condition 1" as a common portion, or highlights the machining shape "region 11" as a different portion in a manner different from the common portion.

FIG. 14 is a diagram illustrating an example of background information regarding a machining condition displayed by the machining-process generation device illustrated in FIG. 1. When a worker selects a machining condition for the second machining-operation unit as a target in respect of which the background information is to be referenced, the display section 17 obtains background information corresponding to the machining condition for the second machining-operation unit from among the background information stored in the background-information storage section 16. The display section 17 then converts the obtained background information into a display format to display this background information. In the same manner as the example in FIG. 12, the display section 17 also converts the background information illustrated in FIG. 14 into a predetermined format by using a template, a predetermined conversion method, or the like. For example, some part of the text illustrated in FIG. 14, "A5052" and "outer-diameter turning", are the words that can be changed, while other parts of the text are fixed.

The table illustrated in FIG. 14 includes a part of the currently-generated new process and includes, as background information, some of the process instances, which have been used to generate this part. FIG. 14 illustrates four process instances. The display section 17 extracts four of the process instances having been used to generate the new process, in the ascending order of difference in removal volume from the second machining-operation unit of the new process, and then displays the extracted four process instances. At this time, the display section 17 rearranges and displays the extracted four process instances in the ascending order of difference in removal volume from the new process. The display section 17 can also calculate an estimated value of the cutting speed for each of the extracted process instances by using regression analysis, and display the estimated value as illustrated in the "cutting speed (estimated)" column of the table in FIG. 14. It is also allowable that when the display section 17 converts background information, the display section 17 generates a diagram illustrating a distribution and a regression line of the process instances as illustrated in FIG. 10 and displays the generated diagram as a part of the converted background information.

Reference is made back to FIG. 2. After having displayed the background information, the display section 17 determines on the basis of a worker's operation whether reference of the background information is ended (Step S110). For example, the screen on which background information is displayed includes a display end button (not illustrated). When it is detected that a worker has operated this display end button, the display section 17 determines that reference of the background information is ended. When reference of the background information is not determined to be ended (NO at Step S110), the display section 17 continues to make the determination at Step S110 until reference of the background information is determined to be ended. When reference of the background information is ended (YES at Step S110), the display section 17 displays the currently-generated new process again (Step S105). The display section 17 determines again whether the background information is referenced on the machining-process display screen (Step S106). When the background information is not referenced (NO at Step S106), the new-process editing section 18 determines whether the currently-generated new process is edited (Step S111). For example, the machining-process display screen includes an edit button (not illustrated). When a worker operates this edit button, the new-process editing section 18 can determine to edit the new process. When the new-process editing section 18 determines to edit the new process (YES at Step S111), the new-process editing section 18 edits the new process (Step S112).

After the new-process editing section 18 ends editing of the new process, or when the new-process editing section 18 determines not to edit the new process (NO at Step S111), the process-instance change section 19 determines whether the new process is entered into the process instances (Step S113). Specifically, the process-instance change section 19 displays a screen for selecting whether to enter the new process into the process instances, and encourages a worker to select whether to enter the new process into the process instances. When the new process is added to the process instances (YES at Step S113), provided that the new-process editing section 18 has edited the new process, the process-instance change section 19 stores the edited new process in the process-instance storage section 11, or provided that the new-process editing section 18 has not edited the new process, the process-instance change section 19 stores the new process generated by the process generation section 14, directly in the process-instance storage section 11 (Step S114). When the new process is not added to the process instances (NO at Step S113) or after the new process has been added to the process instances, the machining-process generation device 10 ends the operation.

Figure 16:
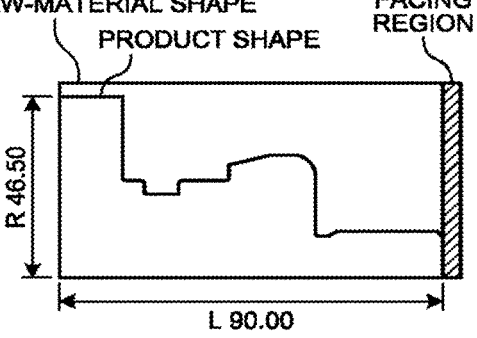
FIG. 16 is a diagram illustrating an example of background information displayed by the machining-process generation device illustrated in FIG. 1.

The background-information display method is not limited to the example described above. Other examples of the screen on which background information is displayed are described herein. FIG. 15 is a diagram illustrating an example of a generated machining process displayed by the machining-process generation device illustrated in FIG. 1. FIG. 16 is a diagram illustrating an example of background information displayed by the machining-process generation device illustrated in FIG. 1. FIG. 17 is a diagram illustrating a comparative example between a new process and background information displayed by the machining-process generation device illustrated in FIG. 1.

The display section 17 first displays a generated machining process. The machining process illustrated in FIG. 15 includes four pieces of machining-operation unit data. When the type of machining "facing" in the first machining-operation unit of the displayed machining process is selected, the display section 17 can display background information illustrated in FIG. 16. On a screen illustrated in FIG. 16, information on a currently-generated machining process and information on process instances extracted in determining a machining method in the first machining-operation unit of the currently-generated machining process are displayed side by side. The information on the currently-generated machining process illustrates a product shape, a raw-material shape, and a machining shape for each of the candidates for the machining methods. Further, the information on the currently-generated machining process illustrates an axial length L and a radial length R, and also shows a numerical value of the product outer-shape dimension ratio that is a ratio between L and R. The information on the process instances includes statistics information on a plurality of extracted process instances and a list of the extracted process instances.

The instance number of the process instance illustrated in FIG. 16 is linked with a comparative diagram illustrated in FIG. 17. When a worker selects the instance number, the display section 17 displays the comparative diagram illustrated in FIG. 17. The comparative diagram illustrates the raw-material type, the product outer-shape dimension ratio, the selected machining method, the machining-operation unit data of the generated machining process, and the candidate for the machining methods for a target machining-operation unit, for the currently-generated machining process and the process instance. Each of the candidates for the machining methods is illustrated with a machined region provided by the corresponding machining method is performed and with the axial length L and the radial length R.

Figure 18:
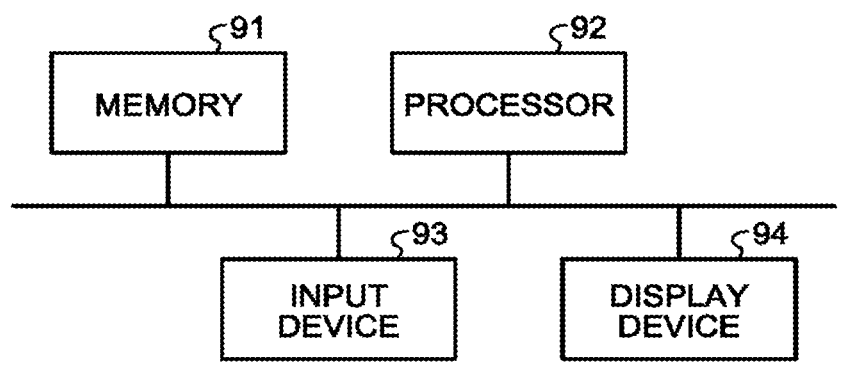
FIG. 18 is a hardware configuration diagram of the machining-process generation device according to the first embodiment.

FIG. 18 is a hardware configuration diagram of the machining-process generation device according to the first embodiment. Each function of the machining-process generation device 10 can be implemented using a memory 91, a processor 92, an input device 93, and a display device 94. The memory 91 is a storage unit that stores therein a computer program describing each function of the machining-process generation device 10 and data needed during execution of the computer program. The processor 92 is a processing device that reads and executes the computer program stored in the memory 91. The input device 93 is a keyboard, a mouse, or the like. The display device 94 is a display or the like. The process-instance storage section 11, the generation-condition storage section 13, the new-process storage section 15, and the background-information storage section 16 are implemented using the memory 91. The generation-condition input section 12, the process generation section 14, the display section 17, the new-process editing section 18, and the process-instance change section 19 are implemented by the memory 91, the processor 92, the input device 93, and the display device 94 in cooperation with each other.

While the input device 93 and the display device 94 are included in the machining-process generation device 10 in FIG. 18, the present invention is not limited to such example. The machining-process generation device 10 may include an input interface in place of the input device 93, or may include an input interface in addition to the input device 93, the input interface being connected to the input device 93. The machining-process generation device 10 can output an input signal from the input device 93 connected to the input interface to the processor 92. The machining-process generation device 10 may include an output interface in place of the display device 94, or may include an output interface in addition to the display device 94, the output interface being connected to the display device 94. The machining-process generation device 10 can output a display screen using the display device 94 connected to the output interface in accordance with instructions from the processor 92.

In the first embodiment described above, background information that indicates a background to the generation of a machining process is displayed. The background information includes information on a process instance that is the past machining process having been used to generate a machining process. Use of this configuration can reduce the time required for referencing information necessary for checking whether there is a problem with using the generated machining process in production, as compared to a case where the background information is not shown to a worker. A worker can obtain more information before trial production by referring to the background information, thereby reducing the number of times of the trial production. Accordingly, the time required for confirming the adequacy of the generated manufacturing process can be reduced. Since this background information is based on process-instance information indicating instances of the machining processes generated in the past, the worker can fully understand the contents of the background information easily and can confirm the adequacy of the machining process easily.

If a machining process is generated on the basis of know-how that is not a worker's knowledge and experience, it is difficult for the worker to determine the adequacy of the generated machining process solely by referring the machining process. In a system using an expert system, if specialized rules are displayed as background information, it is difficult for a worker to determine the adequacy of the machining process unless the worker understands the rules and the expert system. For this reason, it is very effective to display process instance-based background information. Background information is illustrated for each part of the generated machining process. As the background information, some of the process instances, which have been used for generating a target portion, are illustrated. Due to this configuration, it is easy for a worker to understand how the displayed process instances have been used. The background information described above can be displayed regardless of the method for generating a machining process as long as the background information uses a process instance to generate a machining process.

Further, the machining-process generation device 10 generates a machining process on the basis of a process instance. When the generated machining process needs to be changed, the changed machining process is stored as a process instance, such that this change can be reflected on the subsequent machining-process generation. In the first embodiment described above, the process-instance change section 19 displays a screen for selecting whether to enter a newly-generated machining process into the process instances. By sorely performing an entry operation on this screen, for example, solely pressing an entry button, a worker can enter the newly-generated machining process as a process instance. In a device using an expert system, in order to reflect the changes to a machining process on the subsequent machining-process generation, it is necessary to manually edit a group of rules in consideration of what kind of rules are needed. In contrast to this, with the configuration described above, the changes to a machining process can be reflected on the subsequent machining-process generation without requiring much time and effort. As the number of process instances is increased, the likelihood of generating an adequate machining process becomes higher.

The machining-process generation device 10 displays, as background information, a condition for extracting a process instance used for generating a machining process. It is thus possible for a worker to easily consider whether this extraction condition falls within an appropriate range.

Further, the machining-process generation device 10 displays, as background information, the type of characteristics such as the axial length, the radial length, and the removal volume as well as the characteristic values. It is thus possible for a worker to select on the basis of the characteristic values which of the process instances displayed as background information needs to be referenced. The worker can thus determine the adequacy of a machining process in a shorter time as compared to a case where no determination criteria are provided to the worker.

Second Embodiment

Figure 19:
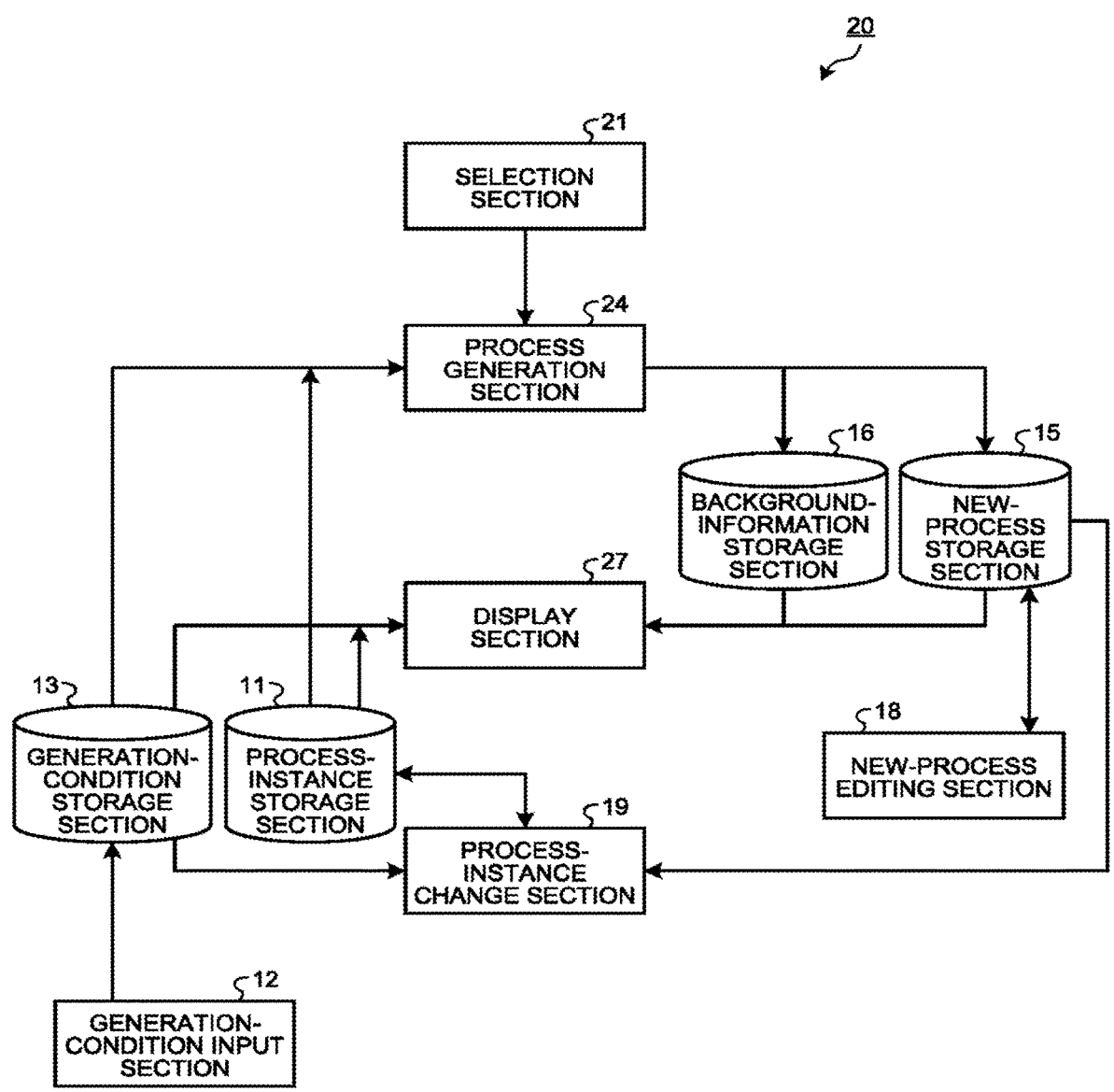
FIG. 19 is a functional configuration diagram of a machining-process generation device according to a second embodiment.

FIG. 19 is a functional configuration diagram of a machining-process generation device according to a second embodiment. A machining-process generation device 20 illustrated in FIG. 19 includes the process-instance storage section 11, the generation-condition input section 12, the generation-condition storage section 13, the new-process storage section 15, the background-information storage section 16, the new-process editing section 18, the process-instance change section 19, a selection section 21 selection section 21, a process generation section 24, and a display section 27. The machining-process generation device 20 includes the process generation section 24 and the display section 27, respectively, in place of the process generation section 14 and the display section 17 in the machining-process generation device 10 according to the first embodiment. The machining-process generation device 20 further includes the selection section 21.

In the following descriptions, explanations of constituent elements having identical functions as those of the first embodiment are omitted and parts different from the machining-process generation device 10 are mainly explained.

The machining-process generation device 10 according to the first embodiment has a function of displaying background information after having generated the entire machining process. In contrast to this, the machining-process generation device 20 according to the second embodiment generates a plurality of candidates for each process part that is a part of the machining process, displays the generated candidates, and uses a candidate selected by a worker from among the displayed candidates to thereby generate a machining process. At this time, the machining-process generation device 20 is capable of displaying background information on the candidate during generation of the machining process.

The process generation section 24 generates a plurality of candidates for each process part. The process part refers to a machining method, a tool to be used, a machining shape, a machining condition, or the like in each machining-operation unit. For example, the process generation section 24 can generate a plurality of different candidates by different methods. The display section 27 displays candidates for the process part which are generated by the process generation section 24, and displays background information on the candidates for the process part. The selection section 21 detects a selection operation performed by a worker on a candidate for the process part displayed by the display section 27. Upon detection of the selection operation, the selection section 21 selects a candidate specified by the detected selection operation as a process part of the machining process. The process generation section 24 uses the candidate selected by the selection section 21 to thereby generate a machining process.

The hardware configuration of the machining-process generation device 20 according to the second embodiment described above is identical to that of the machining-process generation device 10 according to the first embodiment. The function of the selection section 21 is implemented by the memory 91, the processor 92, and the input device 93 in cooperation with each other, which are illustrated in FIG. 18.

Figure 20:
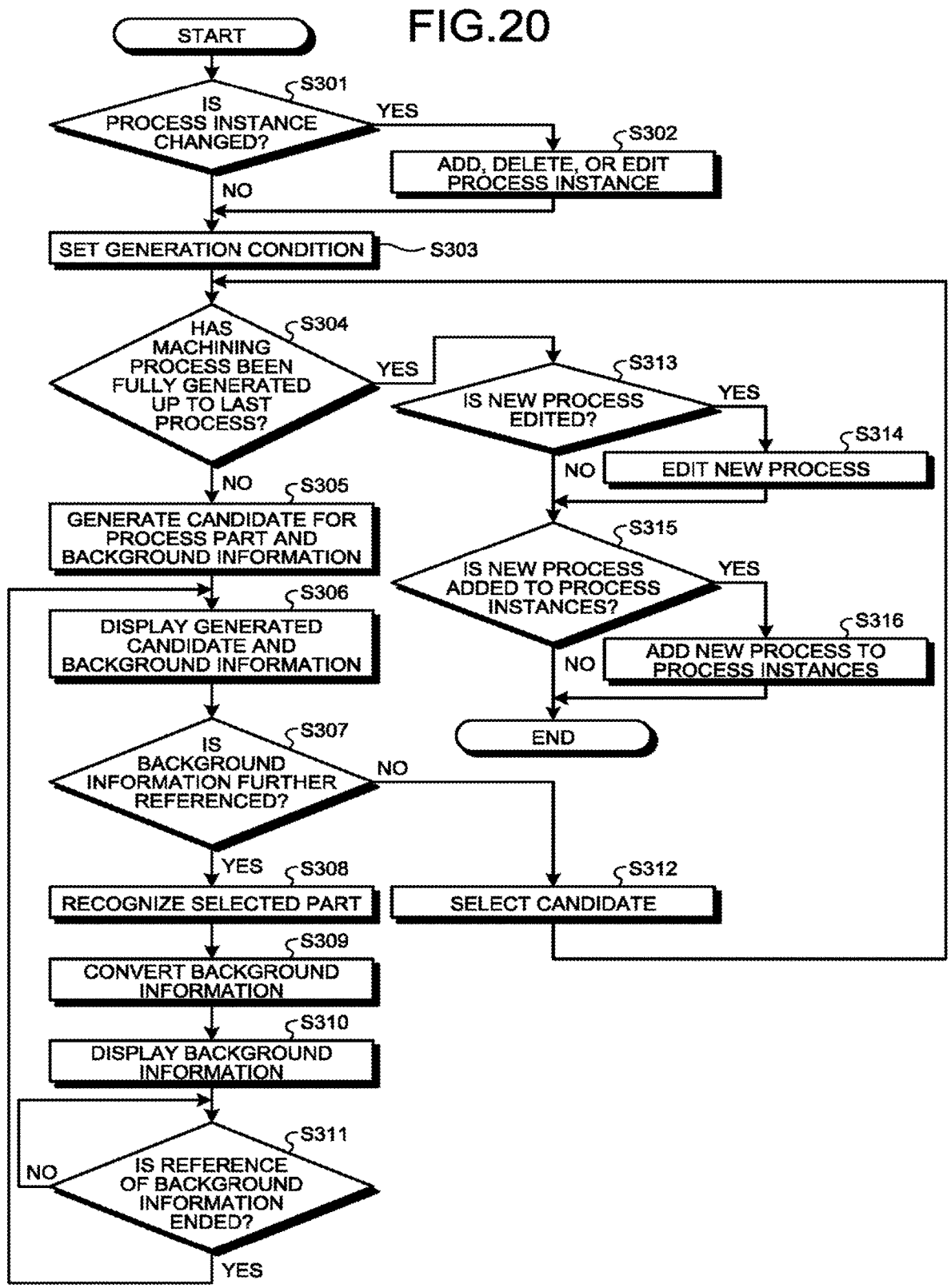
FIG. 20 is a flowchart illustrating an operation of the machining-process generation device illustrated in FIG. 19.

FIG. 20 is a flowchart illustrating an operation of the machining-process generation device illustrated in FIG. 19. Since Steps S301 to S303 are the same as Steps S101 to S103 in FIG. 2, descriptions thereof are omitted.

The process generation section 24 determines whether a machining process has been fully generated up to the last process (Step S304). Specifically, by referencing a new machining process stored in the new-process storage section 15, the process generation section 24 can determine whether the machining process has been fully generated up to the last process. When the machining process has not yet been fully generated up to the last process (NO at Step S304), the process generation section 24 generates a candidate for the process part that is a part of the machining process and generates background information (Step S305). At Step S305, the process generation section 24 generates candidates for the machining method that is a process part of the first machining-operation unit by using two types of machining methods. The process generation section 24 then generates background information on each of the generated candidates. For example, the process generation section 24 generates a first candidate using a frequency in the same manner as in the first embodiment. The specific generation method is the same as in the first embodiment, and has been already described using Steps S201 to S206 in FIG. 5. Detailed descriptions thereof are thus omitted. The process generation section 24 generates a second candidate for the machining method by means of discriminant analysis. Specifically, the process generation section 24 calculates a machining shape on the basis of a removal shape for a generation-target unit, and extracts, from among the machining-operation units of the process instances stored in the process-instance storage section 11, machining-operation unit instances that are machining-operation units with the machining method of the two types: the facing and the outer-diameter turning. The process generation section 24 extracts machining-operation unit instances with the code of raw-material type A5052 from among the extracted machining-operation unit instances. In a case where the number of extracted machining-operation unit instances is 12 but a predetermined number of machining-operation unit instances that should be extracted is 20, the number of extracted machining-operation unit instances does not reach 20. Thus, the process generation section 24 eases the extraction condition for the raw-material type. Specifically, the process generation section 24 eases the extraction condition for the raw-material type to aluminum alloy whose code is in "5000s", such that the extraction range can expand to similar raw-material types. Now assume that 40 machining-operation unit instances have been extracted using the eased extraction condition.

Figure 21:
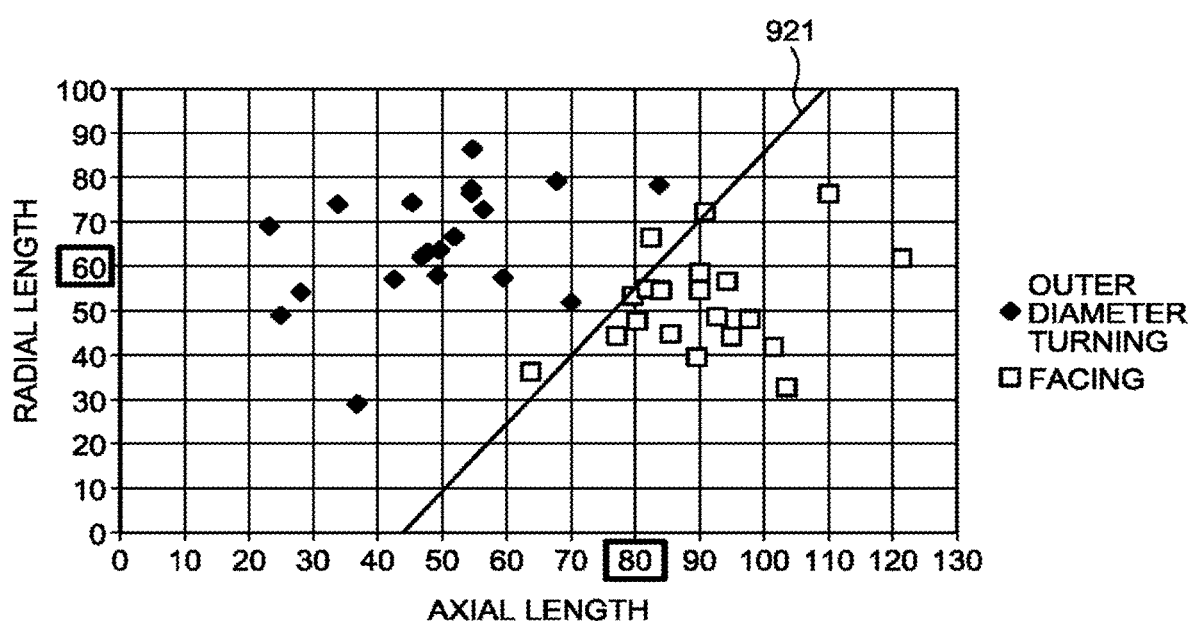
FIG. 21 is a diagram illustrating an example of discriminant analysis performed by the machining-process generation device illustrated in FIG. 19.

The process generation section 24 calculates characteristic values of a generation-target unit and of each of the 40 extracted machining-operation unit instances. In the same manner as in the first embodiment, the process generation section 24 uses the axial length and the radial length as the characteristic values. The generation-target unit has an axial length of 80 mm and a radial length of 60 mm. The process generation section 24 calculates an axial length and a radial length in each of extracted machining-operation unit instances, and uses these two types of values, i.e., the characteristic values to perform discriminant analysis with the respective machining methods for the machining-operation unit instances being categorized into a facing group and an outer-diameter turning group. FIG. 21 is a diagram illustrating an example of discriminant analysis performed by the machining-process generation device illustrated in FIG. 19. In FIG. 21, the horizontal axis represents an axial length and the vertical axis represents a radial length, and calculated values of these lengths of the respective machining-operation unit instances are plotted. A boundary line 921 illustrates a boundary in the plot shown in FIG. 21 by which the machining methods are categorized into the facing group and the outer-diameter turning group. The process generation section 24 calculates a group belonging to the plot position corresponding to an 80 mm axial length and a 60 mm radial length in the generation-target unit, and determines a machining method for the generation-target unit. In FIG. 21, since the plot position corresponding to the 80 mm axial length and the 60 mm radial length belongs to the outer-diameter turning group, the process generation section 24 determines that the outer-diameter turning is the second candidate machining method for the generation-target unit.

After having generated candidates for the process part, the process generation section 24 generates background information on the generated candidates for the process part. The background information on the second candidate includes information indicating that the method using discriminant analysis has been utilized, the definition of a discriminant space and a boundary line, a condition for extracting a machining-operation unit instance, and the instance number of a process instance to which the extracted machining-operation unit belongs.

After having finished generating the two candidates for the machining method, the process generation section 24 stores the two candidate machining methods in the new-process storage section 15. After having generated background information, the process generation section 24 stores the generated background information in the background-information storage section 16.

Reference is made back to FIG. 20. When the process generation section 24 generates the candidate for the process part, the display section 27 displays the generated candidate and background information (Step S306). FIG. 22 is a diagram illustrating an example of candidates for the process part displayed by the machining-process generation device illustrated in FIG. 19. This screen includes an already-generated machining process part and the candidates for the selection of the machining method and background information of each on the candidates. In FIG. 22, since there is no already-generated process part, only the machining-operation unit number of a machining-operation unit being generated is illustrated, while other parts of the machining process, which have not yet been generated, are left blank. As background information, each candidate generation method, an extraction condition for a process instance extracted to generate the candidate, and the instance number of the most similar instance are illustrated. A template is used to display this background information. Some part of the text, "A5052", "aluminum alloy with the code in 5000s", "2609", and "9174", are the words that can be changed, while other parts of the text are fixed. The display section 27 generates text by extracting some words from the background information and inserting the extracted words into the sections of the template where words can be changed.

The display section 27 determines whether the background information is further referenced (Step S307). Specifically, the selection candidates illustrated in FIG. 22 are linked with a screen on which background information of each of the selection candidates is displayed in further detail. On the basis of whether there is a worker's selection operation on each candidate, the display section 27 determines whether the background information is further referenced. For example, when a worker's operation of selecting the candidate for the machining method is detected, the display section 27 determines that the background information is further referenced (YES at Step S307), and then further displays background information regarding the generation of the selected candidate for the machining method.

The detected operation allows the display section 27 to recognize a selected part (Step S308). The display section 27 obtains, from the background-information storage section 16, background information corresponding to the selected part, and converts the obtained background information into a display format (Step S309). For example, in a case where the selected part is "outer-diameter turning" for a candidate 2, the display section 27 obtains background information corresponding to "outer-diameter turning" for the candidate 2 and converts the obtained background information in accordance with a predetermined method. When the background information is converted, the display section 27 displays the converted background information (Step S310).

FIG. 23 is a diagram illustrating an example of background information displayed by the machining-process generation device illustrated in FIG. 19. In the example in FIG. 23, a template is used to display the text part of the background information. Some part of the text, "aluminum alloy with the code in 5000s" and "either of the two types, facing or outer-diameter turning", are the words that can be changed, while other parts of the text are fixed. A method for converting the background information into a table is also predetermined. The display section 27 generates a table in accordance with this predetermined conversion method. The display section 27 calculates, on a group-by-group basis, an instance which is the closest to the center position of the group among the machining-operation unit instances used in the discriminant analysis, and calculates an instance which is the closest to the generated, first machining-operation unit within the discriminant space among the instances belonging to the group, and then shows the calculated results in the table. The center position of each group refers to a position at the average value of characteristic values of the instances belonging to the group. The method for calculating the center position is not limited to calculation of the average value. Depending on the used generation method, the display section 27 can also change the method for calculating the center position. The display section 27 calculates the center position of each group within the discriminant space, a distance between the center position and each instance, a distance between the generated, first machining-operation unit and each instance, and the like.

It is allowable that the instance number displayed on the screen in FIG. 23 is linked with a screen on which the comparative diagram illustrated in FIG. 13 or FIG. 17 is shown. In this case, the display section 27 generates and displays a comparative diagram corresponding to the selected instance number.

Although not illustrated, when the display section 27 converts background information, the display section 27 may generate a distribution of machining-operation unit instances within the discriminant space and the boundary line 921 of the groups as illustrated in FIG. 21, and displays the distribution and the boundary line 921 as a part of the converted background information to a worker.

The display section 27 determines whether reference of the background information is ended (Step S311). For example, the display section 27 displays an operation button (not illustrated) for ending referencing the background information. When the display section 27 detects an operation on the operation button, the display section 27 can determine that reference of the background information is ended. When reference of the background information is not ended (NO at Step S311), the display section 27 continues to make the determination at Step S311 until determining that the reference of the background information is ended.

When reference of the background information is to be ended (YES at Step S311), the display section 27 displays generated candidates and background information again (Step S306). When the background information is not to be displayed any more (NO at Step S307), the selection section 21 selects any of the candidates (Step S312). Specifically, the selection section 21 detects a selection operation of selecting any of the candidates, and sets the selected candidate as a process part of the machining process.

The process generation section 24 continues to generate a machining process, using a candidate selected by the selection section 21. The process generation section 24 determines again whether the machining process has been fully generated up to the last process (Step S304). When it is determined that the machining process has not yet been fully generated up to the last process (NO at Step S304), the process generation section 24 advances to Step S305 again to generate a candidate for the next process part and generate background information. The processes at Steps S304 to S311 are repeated until the machining process has been fully generated up to the last process.

When it is determined that the machining process has been fully generated up to the last process (YES at Step S304), the process generation section 24 advances to Step S313. Since the processes at Steps S313 to S316 are the same as those at Steps S111 to S114 in FIG. 2, descriptions thereof are omitted.

In the second embodiment described above, candidates for all of the process parts are displayed such that a worker can select the candidate from among the candidates. However, the present invention is not limited to such an example. For example, it is allowable that a worker selects the candidate for some of all the process parts. Items such as machining method, tool to be used, machining shape, and machining condition is defined as a single unit of the process part. However, the present invention is not limited to such an example. For example, it is allowable that a machining-operation unit or the like is defined as a single unit, for which a plurality of candidates each having combined multiple items are generated, so that a worker can select any of the candidates.

While discriminant analysis is used in the second embodiment described above, any alternative method may be used as long as the method is intended to identify machining-operation unit of a process instance as learning data. Specifically, a support vector machine, a neural network, or other methods may be used. In this case, it is allowable that the type of identification method is included in background information. It is also allowable to display as background information a list of all machining-operation units used as learning data for identification.

As described above, the process generation section 24 in the machining-process generation device 20 according to the second embodiment generates a plurality of candidates for a constituent part of the machining process, and generates background information on each of the candidates. The display section 27 is capable of displaying a plurality of candidates and background information on each of the candidates. The process generation section 24 generates a machining process, using a candidate selected from among the candidates displayed by the display section 27. Due to this configuration, a worker, who references the background information generated for each candidate, can consider which of the candidates has been generated on the basis of an appropriate background, and can select a candidate that is to be used as a constituent part of the machining process. Where background information is displayed after the entire machining process has been generated, when the machining process is partially modified and affects the whole of the machining process, many portions of the machining process need to be redesigned manually. This would require much time and effort. In contrast to this, in the second embodiment, during generation of a machining process, a plurality of candidates for each part of the machining process can be generated, and background information on each of the candidates can be displayed. Accordingly, the machining process can be generated reflecting a worker's selection without redesigning the machining process to a great extent. This can reduce time required for generating a machining process.

In the second embodiment, when an identification method which learns the type of machining method, tool to be used, and the like as a group is used, a machining-operation unit instance, which is the closest to the center position of the group, and a machining-operation unit instance, which is close to the new process, are both displayed as background information on a group-by-group basis. Accordingly, a worker is saved from calculating a distance between each instance and the center position, a distance between instances, and the like. This makes it possible for the worker to efficiently reference machining-operation unit instances.

Third Embodiment

Figure 24:
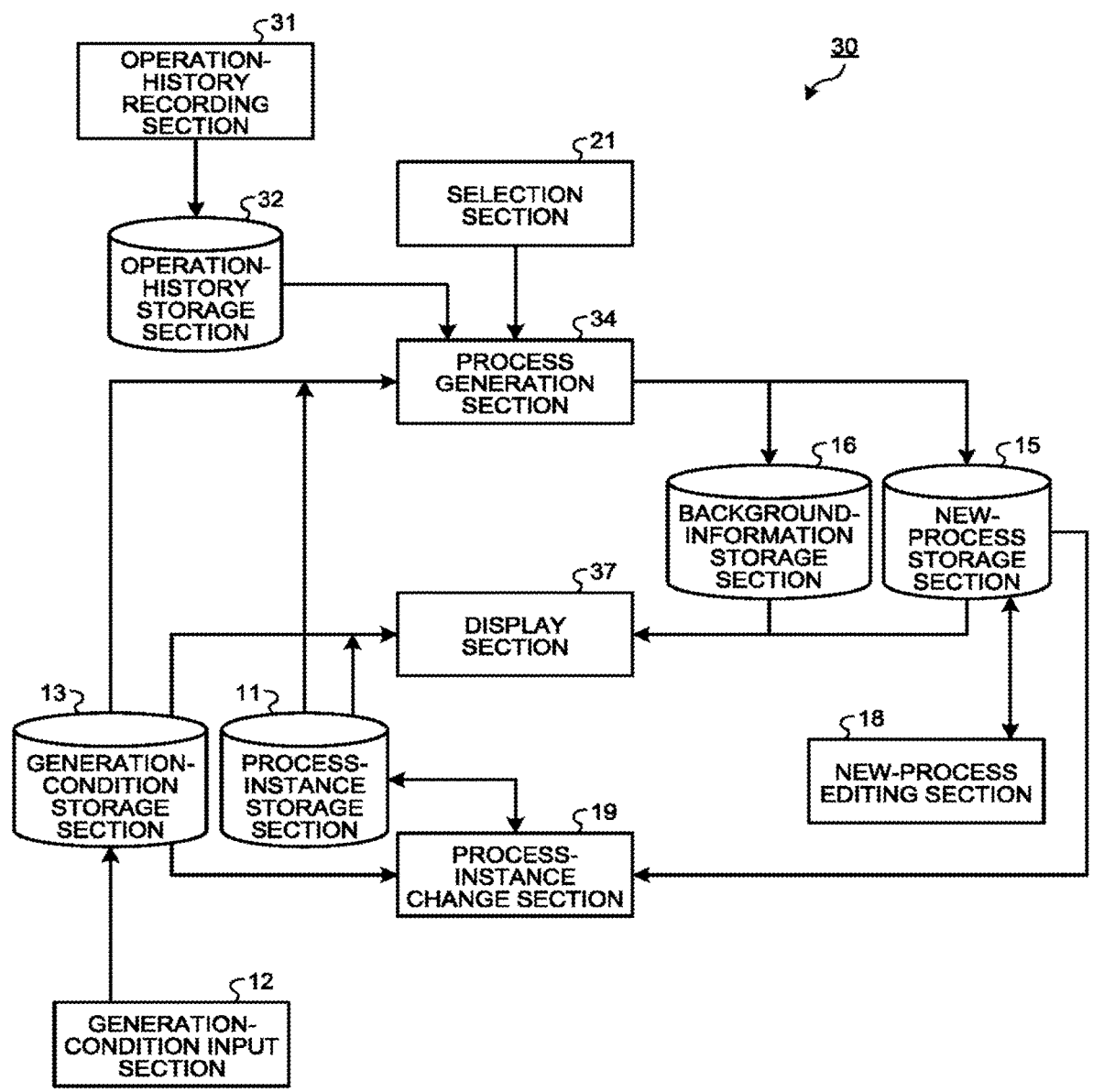
FIG. 24 is a functional configuration diagram of a machining-process generation device according to a third embodiment.

FIG. 24 is a functional configuration diagram of a machining-process generation device according to a third embodiment. A machining-process generation device 30 illustrated in FIG. 24 includes the process-instance storage section 11, the generation-condition input section 12, the generation-condition storage section 13, the new-process storage section 15, the background-information storage section 16, the new-process editing section 18, the process-instance change section 19, the selection section 21, an operation-history recording section 31, an operation-history storage section 32, a process generation section 34, and a display section 37. The machining-process generation device 30 includes the process generation section 34 and the display section 37, respectively, in place of the process generation section 24 and the display section 27 in the machining-process generation device 20. The machining-process generation device 30 further includes the operation-history recording section 31 and the operation-history storage section 32.

The machining-process generation device 30 according to the third embodiment has a function of recording a worker's operation history. The machining-process generation device 30 uses a recorded operation history in generating a machining process and converting background information. In the following descriptions, parts different from the second embodiment are mainly explained.

The operation-history recording section 31 stores, in the operation-history storage section 32, an operation history that is details of an operation performed by a worker on the machining-process generation device 30. The date and time of the operation is also stored along with the operation history in the operation-history storage section 32. When the machining-process generation device 30 is in the middle of performing a login process that can identify a worker, it is allowable that the operation-history recording section 31 records therein identification information for identifying the worker along with the operation details.

The operation history includes operation details on generation of a machining process and operation details on reference of background information. The operation details on generation of a machining process include edited details performed on a process instance stored in the process-instance storage section 11 by the process-instance change section 19 in accordance with instructions from a worker, edited details performed on a process stored in the new-process storage section 15 by the new-process editing section 18 in accordance with instructions from the worker, and details of the candidate selected by the selection section 21 in accordance with instructions from the worker. The operation details on reference of background information include details on selection of background information displayed by the display section 37, in accordance with instructions from the worker.

The machining-process generation device 30 operates as illustrated in FIG. 20 in the same manner as in the second embodiment. The operation-history recording section 31 records therein an operation history simultaneously with the operation illustrated in FIG. 20. A specific example of the timing at which the machining-process generation device 30 records therein an operation history during the operation illustrated in FIG. 20, and a specific example of the operation history to be recorded are described.

While the process-instance change section 19 performs the process at Step S302, the operation-history recording section 31 records therein details of worker's operation along with the date and time of the operation. The operation details to be recorded include the instance number of a changed process instance, a changed machining-operation unit and a changed process part of the process instance, and a changed value. When multiple changes are made at Step S302, the operation-history recording section 31 records therein multiple operation histories. Specifically, assume that at Step S302, a worker selects a process instance with an instance number of 1234, and changes the cutting speed that is a machining condition for a third machining-operation unit of this process instance from 540 m/min to 560 m/min, and this change operation has been performed at the date and time, Mar. 4, 2012, at 12:34 pm. In this case, the operation-history recording section 31 records therein the operation date and time as Mar. 4, 2012, at 12:34 pm, and records therein the operation details indicating that the cutting speed for the third machining-operation unit with the instance number of 1234 has been changed to 560 m/min.

While the display section 37 performs the process at Step S312, the operation-history recording section 31 records therein details of worker's operation along with the date and time of the operation. The operation details to be recorded include the instance number of a machining process being generated, a candidate selected by the worker, information indicating for which machining-operation unit and for which part of the machining-operation unit the selected candidate is, and a value set for the part of the machining-operation unit on the basis of the candidate details.

While the new-process editing section 18 performs the process at Step S314, the operation-history recording section 31 records therein details of worker's operation along with the date and time of the operation. The operation details to be recorded include the instance number of an edited machining process, an edited machining-operation unit, an edited process part, and an edited value.

While the display section 37 performs the process at Step S308, the operation-history recording section 31 records therein details of worker's operation along with the date and time of the operation. The operation details to be recorded include information for identifying referenced background information such as an instance number and a location where the selected instance number is displayed.

The process generation section 34 can generate a machining process on the basis of: a generation condition stored in the generation-condition storage section 13; a process instance stored in the process-instance storage section 11; and an operation history stored in the operation-history storage section 32. For example, the process generation section 34 can use the operation history in generating a candidate for the process part. The process generation section 34 extracts, from among the operation histories stored in the operation-history storage section 32, an operation history having been used to generate a candidate for a process part that is the same as the process part being generated. Specifically, when the process generation section 34 generates a candidate for the cutting speed as a machining condition, the process generation section 34 extracts an operation history having been used to set the value of the cutting speed. The process generation section 34 then uses a process instance of each of the extracted operation histories to obtain information on the raw-material type and the machining method so as to further narrow down the operation histories with the same raw-material type and the same machining method as a generation-target unit. Thereafter, the process generation section 34 sets the value of the cutting speed in each of the narrowed operation histories as a candidate, and generates information indicating that a method using the operation histories has been utilized as background information. Thus, as a result of narrowing down the operation histories, the number of generated candidates becomes equal to the number of the remaining operation histories.

The display section 37 can display background information on a display device on the basis of an operation history. For example, from among process instances used to generate a machining process, the display section 37 can determine, on the basis of an operation history, a process instance to be displayed as background information. FIG. 25 is a diagram illustrating an example of candidate machining methods and background information displayed by the machining-process generation device illustrated in FIG. 24. FIG. 25 displays two types of candidates for the machining process. On the basis of an operation history, the display section 37 determines a process instance to be displayed as background information. For example, the display section 37 obtains histories of operations performed on the screen illustrated in FIG. 23. The display section 37 then calculates the frequency of each of referenced background information on the basis of the obtained operation histories. For example, when the instance number of "instance closest to the currently-generated new process in the facing group" on the screen in FIG. 23 is selected with the highest frequency, the display section 37 can display "instance closest to the currently-generated new process in the facing group: 3213", as background information on the candidate 2 in FIG. 25. The screen in FIG. 25 is generated using a template in which some part of the text "A5052", "2609", "aluminum alloy with the code in 5000s", "instance closest to the currently-generated new process in the facing group", and "3213" are the words that can be changed, while other parts of the text are fixed. The display section 37 generates this screen by inserting a character string in the template.

When the process generation section 34 generates a machining process on the basis of an operation history, the display section 37 can display the operation history as background information. FIG. 26 is a diagram illustrating an example of candidate machining conditions and background information displayed by the machining-process generation device illustrated in FIG. 24. Two candidates for the cutting speed that is a machining condition are generated. In a case where the candidate 2 is generated on the basis of an operation history, the display section 37 can display information indicating that the operation history has been used as a method for generating the candidate 2, and display the details of the operation history as background information.

It is allowable that an operation history that is used by the process generation section 34 in generating a machining process includes edited details at the time when the process-instance change section 19 edits a process instance stored in the process-instance storage section 11, or includes selection details at the time when the selection section 21 selects a candidate for the process part. It is further allowable that an operation history that is used by the process generation section 34 in generating a machining process includes edited details at the time when the new-process editing section 18 edits a new process.

When there is an operation history that can be used, the process generation section 34 may generate a process part on the basis of the operation history. When there is not an operation history that can be used, the process generation section 34 may utilize the method used in the first embodiment to automatically generate the entire machining process.

The hardware configuration of the machining-process generation device 30 according to the third embodiment described above is identical to that of the machining-process generation device according to the first embodiment. The function of the operation-history recording section 31 is implemented by the memory 91, the processor 92, and the input device 93 in cooperation with each other, which are illustrated in FIG. 18. The function of the operation-history storage section 32 is implemented using the memory 91.

As described above, according to the third embodiment of the present invention, an operation history can be used to generate a machining process and background information. Accordingly, a candidate corresponding to an operation performed by a worker in the past on the machining process can be provided as one of the options to the worker. Since it is possible to prevent the worker from making similar modifications to the machining process, the time and effort required for generation of the machining process can be reduced.

Using an operation history of background-information browsing enables the highly-frequently browsed background information to be identified as being useful for a worker, and this background information can be displayed with higher priority. Thus, a worker can confirm the adequacy of the machining process more easily.

The configurations described in the above embodiments are only examples of the content of the present invention. The configurations can be combined with other well-known techniques, and a part of each configuration can be omitted or modified without departing from the scope of the present invention.

For example, in the first embodiment described above, a machining method is determined using the same generation method between the first machining-operation unit and the second machining-operation unit. However, the present invention is not limited to such an example. For example, different methods may be used for different machining-operation units. At this time, the process generation section 14 can select a generation method in accordance with a removal shape. In the first embodiment described above, linear regression analysis with one variable is used for generation of a machining condition that is the cutting speed. The present invention is not limited to such an example. For example, it is allowable to use a regression analysis method such as non-linear regression analysis or multiple regression analysis. Further, the present invention is not limited to regression analysis, but may use a statistics value of extracted instances. The statistics value is, for example, a minimum value, a maximum value, an average value, and a median value.

The operations described in each of the embodiments described above may be performed in an order different from the order illustrated in each of the embodiments within the scope of the technical concept of the present invention. For example, in the embodiments described above, when a process instance is generated on a per machining-operation unit basis, the machining method, the tool to be used, the machined shape, and the machining condition are generated in that order. However, the present invention is not limited to such an example. For example, only the machining method can be determined first for all of the machining-operation units, and thereafter the machined shape, the machining tool, and the machining condition can be determined in that order for each machining-operation unit.

REFERENCE SIGNS LIST 10, 20, 30 machining-process generation device, process-instance storage unit, 12 generation-condition input unit, 13 generation-condition storage unit, 14, 24, 34 process generation unit, 15 new-process storage unit, background-information storage unit, 17, 27, 37 display unit, 18 new-process editing unit, 19 process-instance change unit.

The invention claimed is:

1. A machining-process generation device comprising:
a process-instance storage to store therein process instances that are instances of machining processes generated in the past, each of the machining processes being defined by machining-operation units, each of the machining-operation units indicating details of machining;
a process generator to generate a machining process by generating data on each of machining-operation units of the machining process on a basis of process instances extracted from the process-instance storage and a generation condition for the machining process, and to generate background information indicating a background to generation of data on each of the machining-operation units of the machining process, the background information including information in which the generated data on each of the machining-operation units of the machining process is associated with the extracted process instances, the extracted process instances having been used to generate the data on each of the machining-operation units; and
a display capable of displaying the background information, and displaying side-by-side the generated machining process and a selected one of the process instances in the background information,
wherein each of the process instances includes, as the generation condition for the machining process, tool and machine information for a tool and machine to be used for machining, and
each of the process instances includes a name of a creator of the process instance, a date and time of creation of the process instance, and an identifier of a product manufactured using the process instance.

2. The machining-process generation device according to claim 1, wherein the display converts the background information into at least any of text, table, and diagram to display the background information.

3. The machining-process generation device according to claim 1, wherein the background information further includes an extraction condition for extracting, from among a plurality of the process instances stored in the process-instance storage, the process instance used to generate the machining process.

4. The machining-process generation device according to claim 1, wherein the background information further includes a type and a value of characteristics that is capable of being calculated on a basis of the generation condition.

5. The machining-process generation device according to claim 1, wherein
the process generator generates a plurality of candidates for each of the machining-operation units of the machining process, and generates the background information regarding each of the candidates,
the display displays the candidates and the background information regarding each of the candidates, and
the process generator generates the machining process, using the candidate selected from among the candidates displayed by the display.

6. The machining-process generation device according to claim 1, further comprising a process-instance changer to display a screen for selecting whether to store, in the process-instance storage, a machining process generated by the process generator, the process-instance changer storing the machining process in the process-instance storage upon detection of an operation of storing the machining process in the process-instance storage.

7. The machining-process generation device according to claim 1, further comprising an operation-history recorder to record therein an operation history of generation of the machining process and the background information displayed on the display, wherein
on a basis of the generation condition, the process instance, and the operation history, the process generator generates the machining process.

8. The machining-process generation device according to claim 7, wherein the display displays the background information on a basis of the operation history.

9. The machining-process generation device according to claim 8, wherein
the background information includes information indicating the operation history used to generate the machining process, and
the display displays the operation history as the background information.

10. The machining-process generation device according to claim 8, wherein on the basis of the operation history, the display determines the process instance to be displayed as the background information, from among the process instances used to generate the machining process.

11. A machining-process generation method comprising:
generating a machining process by generating data on each of machining-operation units that define the machining process, on a basis of a generation condition for the machining process and process instances being instances of machining processes generated in the past, each of the machining-operation units indicating details of machining;
generating background information indicating a background to generation of data on each of the machining-operation units of the machining process, the background information including information in which the generated data on each of the machining-operation units of the machining process is associated with the process instances having been used to generate the data on each of the machining-operation units of the machining process; and
displaying side-by-side, from the background information, the generated machining process and a selected one of the process instances used to generate the data on each of the machining-operation units of the machining process on a display,
wherein each of the process instances includes, as the generation condition for the machining process, tool and machine information for a tool and machine to be used for machining, and
each of the process instances includes a name of a creator of the process instance, a date and time of creation of the process instance, and an identifier of a product manufactured using the process instance.

12. The machining-process generation device according to claim 1, wherein each of the process instances includes machining-operation unit data and a sequence of executing the machining-operation unit data.

13. The machining-process generation device according to claim 1, wherein each of the process instances includes, as the generation condition for the machining process, a product shape information, a raw-material shape information, and a raw-material type.

14. A machining-process generation device comprising:
a process-instance storage to store therein process instances that are instances of machining processes generated in the past, each of the machining processes being defined by machining-operation units, each of the machining-operation units indicating details of machining;
a process generator to generate data on each machining-operation unit of a machining process by:
(i) setting a raw material;
(ii) calculating a removal shape that is a shape which the machining-operation unit of the machining process removes from a raw material;
(iii) extracting machining methods corresponding to a machined shape present within the removal shape;
(iv) extracting, from the process-instance storage, process instances including the same raw material as the set raw material and the same machining methods as the extracted machining methods;
(v) determining, as a machining method of the machining-operation unit of the machining process, the most frequently-used one of machining methods of the extracted process instances including the same raw material as the set raw material and the same machining methods as the extracted machining methods;
(vi) generating background information on the determination of the machining method, the background information on the determination of the machining method including the raw material, the extracted machining methods, the extracted process instances, and the most frequently-used machining method;
(vii) extracting, from the process-instance storage, process instances including the same raw material as the set raw material and the same machining method as the determined machining method;
(viii) determining, as a tool of the machining-operation unit of the machining process, the most-frequently-used one of tools of the extracted process instances including the same raw material as the set raw material and the same machining method as the determined machining method;
(ix) generating background information on the determination of the tool, the background information on the determination of the tool including the extracted process instances including the same raw material as the set raw material and the same machining method as the determined machining method;
(x) determining a machining condition of the machining-operation unit of the machining process, using regression analysis based on the process instances including the same raw material as the set raw material and the same machining method as the determined machining method; and
(xi) generating background information on the determination of the machining condition, the background information on the determination of the machining condition including the raw material, the determined machining method, and information on the regression analysis,
a display capable of displaying the background information on the determination of the machining method, the background information on the determination of the tool, and the background information on the determination of the machining condition.

15. The machining-process generation device according to claim 14, wherein the process generator narrows down the extracted process instances to the predetermined number of process instances on the basis of similarity of characteristic values of the extracted process instances and the machining-operation unit, the characteristic values being preset in accordance with types of the extracted machining methods and the number of the extracted machining methods, and
the process generator determines the most frequently-used one of machining methods of the predetermined number of machining process, as the machining method of the machining process.

* * * * *